(12) United States Patent
Shee et al.

(10) Patent No.: US 11,959,997 B2
(45) Date of Patent: Apr. 16, 2024

(54) SYSTEM AND METHOD FOR TRACKING A WEARABLE DEVICE

(71) Applicant: Magic Leap, Inc., Plantation, FL (US)

(72) Inventors: Koon Keong Shee, Miramar, FL (US); Jose Felix Rodriguez, Hialeah, FL (US); Ricardo Arencibia, Tamarac, FL (US); Aly H. M. Aly, Coral Springs, FL (US)

(73) Assignee: Magic Leap, Inc., Plantation, CA (US)

( * ) Notice: Subject to any disclaimer, the term of this patent is extended or adjusted under 35 U.S.C. 154(b) by 378 days.

(21) Appl. No.: 17/100,049

(22) Filed: Nov. 20, 2020

(65) Prior Publication Data

US 2021/0156986 A1 May 27, 2021

Related U.S. Application Data

(60) Provisional application No. 62/939,499, filed on Nov. 22, 2019.

(51) Int. Cl.
*G01S 13/46* (2006.01)
*G01S 7/41* (2006.01)
(Continued)

(52) U.S. Cl.
CPC .............. *G01S 13/46* (2013.01); *G01S 7/412* (2013.01); *G08C 17/02* (2013.01); *H01Q 1/273* (2013.01);
(Continued)

(58) Field of Classification Search
CPC .... G01S 13/46; G01S 7/412; G01S 2013/468; H01Q 1/273; G08C 2201/32
See application file for complete search history.

(56) References Cited

U.S. PATENT DOCUMENTS

| 4,852,988 A | 8/1989 | Velez |
| 6,433,760 B1 | 8/2002 | Vaissie |

(Continued)

FOREIGN PATENT DOCUMENTS

| CA | 2316473 A1 | 1/2001 |
| CA | 2362895 A1 | 12/2002 |
| CA | 2388766 A1 | 12/2003 |

OTHER PUBLICATIONS

Jacob, R. "Eye Tracking in Advanced Interface Design", Virtual Environments and Advanced Interface Design, Oxford University Press, Inc. (Jun. 1995).

(Continued)

*Primary Examiner* — Timothy A Brainard
*Assistant Examiner* — Kenneth W Good
(74) *Attorney, Agent, or Firm* — Morrison & Foerster LLP

(57) ABSTRACT

A method of using a first device to locate a second device is disclosed. The first device, while in a first mode, transmits a first signal and receives a second signal comprising a reflection of the first signal by the second device. The first device determines, based on the received second signal, a position of the second device relative to the first device. The first device transitions to a second mode, and while in the second mode, receives a third signal from the second device. The first device determines, based on the third signal, an orientation of the second device relative to the first device. The first device comprises one or more receiving antennas, and the second device comprises one or more transmitting antennas. The third signal corresponds to a transmitting antenna of the second device.

23 Claims, 13 Drawing Sheets

(51) Int. Cl.
*G08C 17/02* (2006.01)
*H01Q 1/27* (2006.01)

(52) U.S. Cl.
CPC .... *G01S 2013/468* (2013.01); *G08C 2201/32* (2013.01)

(56) References Cited

U.S. PATENT DOCUMENTS

| | | | |
|---|---|---|---|
| 6,491,391 B1 | 12/2002 | Blum et al. | |
| 6,847,336 B1 | 1/2005 | Lemelson | |
| 6,943,754 B2 | 9/2005 | Aughey | |
| 6,977,776 B2 | 12/2005 | Volkenandt et al. | |
| 7,347,551 B2 | 3/2008 | Fergason et al. | |
| 7,488,294 B2 | 2/2009 | Torch | |
| 7,880,618 B2 * | 2/2011 | Tuttle | G06K 19/07786 340/572.1 |
| 8,235,529 B1 | 8/2012 | Raffle | |
| 8,611,015 B2 | 12/2013 | Wheeler | |
| 8,638,498 B2 | 1/2014 | Bohn et al. | |
| 8,696,113 B2 | 4/2014 | Lewis | |
| 8,929,589 B2 | 1/2015 | Publicover et al. | |
| 9,010,929 B2 | 4/2015 | Lewis | |
| 9,274,338 B2 | 3/2016 | Robbins et al. | |
| 9,292,973 B2 | 3/2016 | Bar-Zeev et al. | |
| 9,323,325 B2 | 4/2016 | Perez et al. | |
| 9,720,505 B2 | 8/2017 | Gribetz et al. | |
| 10,013,053 B2 | 7/2018 | Cederlund et al. | |
| 10,025,379 B2 | 7/2018 | Drake et al. | |
| 10,371,786 B1 * | 8/2019 | Orlov | G01S 5/0284 |
| 10,656,604 B2 * | 5/2020 | Godlieb | B26B 19/388 |
| 11,320,527 B1 * | 5/2022 | DeSalvo | G01S 13/88 |
| 11,454,700 B1 * | 9/2022 | DeSalvo | G01S 7/4021 |
| 11,474,227 B1 * | 10/2022 | DeSalvo | G01S 13/04 |
| 11,561,280 B2 * | 1/2023 | Belskikh | G06F 18/24 |
| 2003/0030597 A1 | 2/2003 | Geist | |
| 2006/0023158 A1 | 2/2006 | Howell et al. | |
| 2008/0261693 A1 * | 10/2008 | Zalewski | A63F 13/843 463/31 |
| 2011/0211056 A1 | 9/2011 | Publicover et al. | |
| 2011/0213664 A1 | 9/2011 | Osterhout | |
| 2012/0021806 A1 | 1/2012 | Maltz | |
| 2013/0077147 A1 | 3/2013 | Efimov | |
| 2014/0195918 A1 | 7/2014 | Friedlander | |
| 2015/0168731 A1 | 6/2015 | Robbins | |
| 2017/0353210 A1 * | 12/2017 | Pratt | H04B 7/0617 |
| 2018/0348340 A1 * | 12/2018 | Lien | G01S 7/2813 |
| 2020/0037927 A1 * | 2/2020 | Palero | A61B 18/18 |
| 2020/0187837 A1 * | 6/2020 | Leabman | A61B 5/681 |
| 2021/0126669 A1 * | 4/2021 | Roberts | H04L 5/14 |
| 2023/0244312 A1 * | 8/2023 | Sawai | G06F 3/0346 345/156 |

OTHER PUBLICATIONS

Rolland, J. et al., "High-resolution inset head-mounted display", Optical Society of America, vol. 37, No. 19, Applied Optics, (Jul. 1, 1998).

Tanriverdi, V. et al. (Apr. 2000). "Interacting With Eye Movements in Virtual Environments," Department of Electrical Engineering and Computer Science, Tufts University, Medford, MA 02155, USA, Proceedings of the SIGCHI conference on Human Factors in Computing Systems, eight pages.

Yoshida, A. et al., "Design and Applications of a High Resolution Insert Head Mounted Display", (Jun. 1994).

* cited by examiner

SYSTEM AND METHOD FOR TRACKING A WEARABLE DEVICE

CROSS REFERENCE TO RELATED APPLICATIONS

This application claims the benefit of U.S. Provisional Application No. 62/939,499, filed on Nov. 22, 2019, the entire disclosure of which is incorporated herein by reference for all purposes.

FIELD

This disclosure relates in general to systems and methods for tracking devices, and in particular to systems and methods for tracking radar-enabled devices in a wearable system.

BACKGROUND

Wearable systems frequently incorporate one or more devices that may be held by a user of the wearable system. For some applications of wearable systems, it can be desirable to track the position and orientation of the device with respect to another component of the wearable system, or with respect to a user of the system. It can be further desirable to track the position and orientation of the wearable system with respect to the device or with respect to another component of the wearable system. Such applications can include those in which the device acts as a mouse, pointer, stylus or another input device; and those in which the device is used to indicate a position or orientation of the user's hand (e.g., so a virtual object, such as a virtual sword, can be aligned to the hand and accordingly presented to the user via a display).

As with many input devices, the quality of the user's experience with such a wearable system can depend on the perceived accuracy and latency of the device. For example, applications requiring fine motor input, such as drawing applications, may be rendered useless if the system cannot reliably detect fine movements of the device, and if the results cannot be rendered to the user with a sufficiently low latency. In addition, many such applications benefit from physical flexibility of the device; for instance, the usefulness of the device may be greatly limited if the device must remain tethered to another system component (e.g., a host device, such as a wearable head unit); or within range of a fixed base station. (Tracking a device in certain mobile and/or outdoor applications, in particular, may preclude the use of tethers or fixed base stations.) Moreover, wearable systems may have strict limits on power consumption—for example, because size and weight restrictions of wearable devices may limit the size of a battery that may be used. Size and weight restrictions further limit the number and type of components that can be comfortably housed in the wearable device itself.

Wearable systems present the additional challenge of accommodating a wide variety of environments that may differ significantly in radiation, ambient light, temperature and degrees of electromagnetic interference. Such factors can limit the usefulness of some sensing technologies, which may (for example) require computationally expensive correction algorithms in order to be usable in direct sunlight, or in other bright and high radiation environments.

Accordingly, it is desirable for a tracking technique to track a location (e.g., a position and/or orientation) of a device (including a wearable system and/or other components thereof) with relatively high accuracy and low latency; without requiring a tether or a base station; and with a minimum of power consumption. It is further desirable for such a tracking technique to accommodate the wide variety of environments (including sunlit outdoor environments) that may be encountered by wearable systems.

BRIEF SUMMARY

Examples of the disclosure describe systems and methods for using a first device to locate a second device. The first device, while in a first mode, transmits a first signal and receives a second signal comprising a reflection of the first signal by the second device. The first device determines, based on the received second signal, a position of the second device relative to the first device. The first device transitions to a second mode, and while in the second mode, receives a third signal from the second device. The first device determines, based on the third signal, an orientation of the second device relative to the first device. The first device comprises one or more receiving antennas, and the second device comprises one or more transmitting antennas. The third signal corresponds to a transmitting antenna of the second device. Determining the orientation of the second device relative to the first device comprises determining a ratio of a signal power of the third signal to an expected maximum signal power of its corresponding transmitting antenna.

DETAILED DESCRIPTION

In the following description of examples, reference is made to the accompanying drawings which form a part hereof, and in which it is shown by way of illustration specific examples that can be practiced. It should be understood that other examples can be used and structural changes can be made without departing from the scope of the disclosed examples.

Example Wearable System

Figure 1:
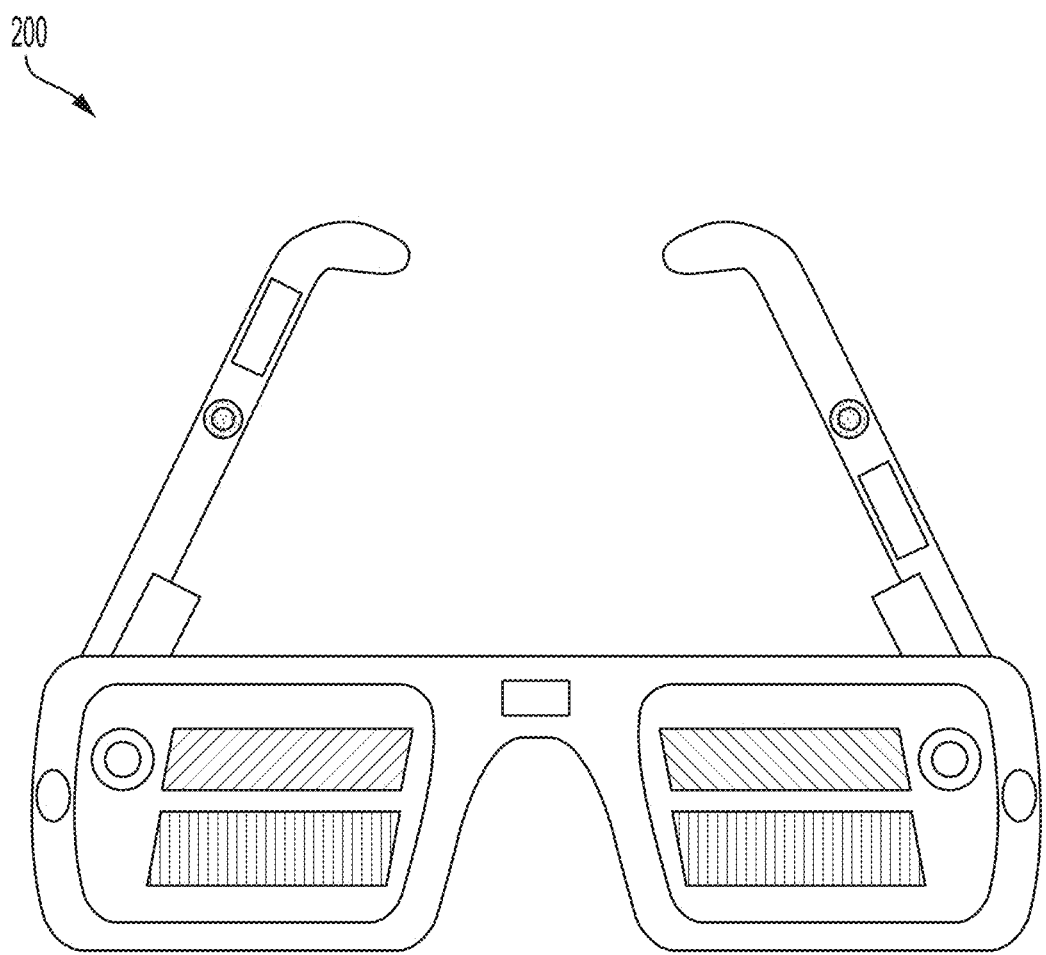
FIG. 1 illustrates an example wearable system according to examples of the disclosure.

FIG. 1 illustrates an example wearable device 200, which may be a head-mountable system configured to be worn on the head of a user. In the example shown, wearable head unit 200 (which may be, e.g., a wearable augmented reality or mixed reality headgear unit) comprises a display (which may comprise left and right transmissive displays, and associated components for coupling light from the displays to the user's eyes); left and right acoustic structures (e.g., speakers positioned adjacent to the user's left and right ears, respectively); one or more sensors such as radar sensors (including transmitting and/or receiving antennas), infrared sensors, accelerometers, gyroscopes, magnetometers, GPS units, inertial measurement units (IMU), acoustic sensors; an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, wearable head unit 200 can incorporate any suitable display technology, and any suitable number, type, or combination of components without departing from the scope of the invention. In some examples, wearable head unit 200 may incorporate one or more microphones configured to detect audio signals generated by the user's voice; such microphones may be positioned in a wearable head unit adjacent to the user's mouth. In some examples, wearable head unit 200 may incorporate networking or wireless features (e.g., Wi-Fi capability, Bluetooth) to communicate with other devices and systems, including other wearable systems. Wearable head unit 200 may further include a battery (which may be mounted in an auxiliary unit, such as a belt pack designed to be worn around a user's waist), a processor, and a memory. In some examples, tracking components of wearable head unit 200 may provide input to a processor performing a Simultaneous Localization and Mapping (SLAM) and/or visual odometry algorithm. Wearable head unit 200 may be a first component of a larger wearable system such as a mixed reality system, that includes additional system components. In some examples, such a wearable system may also include a handheld controller 300, and/or an auxiliary unit 320, which may be a wearable belt pack, as described further below.

Figure 2B:
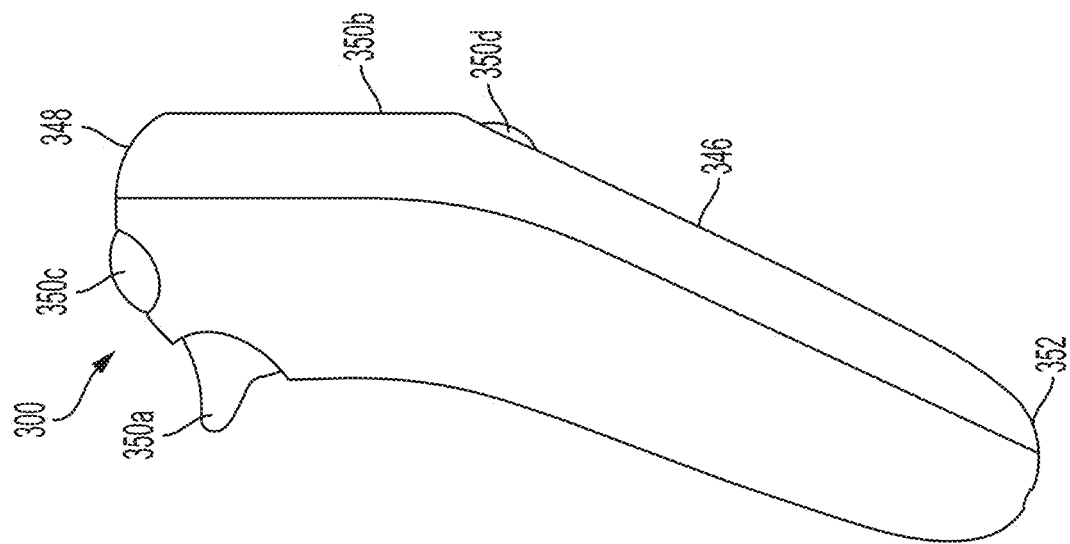
FIGS. 2A-2C illustrate an example handheld controller that can be used in conjunction with an example wearable system according to examples of the disclosure.
Figure 2A:
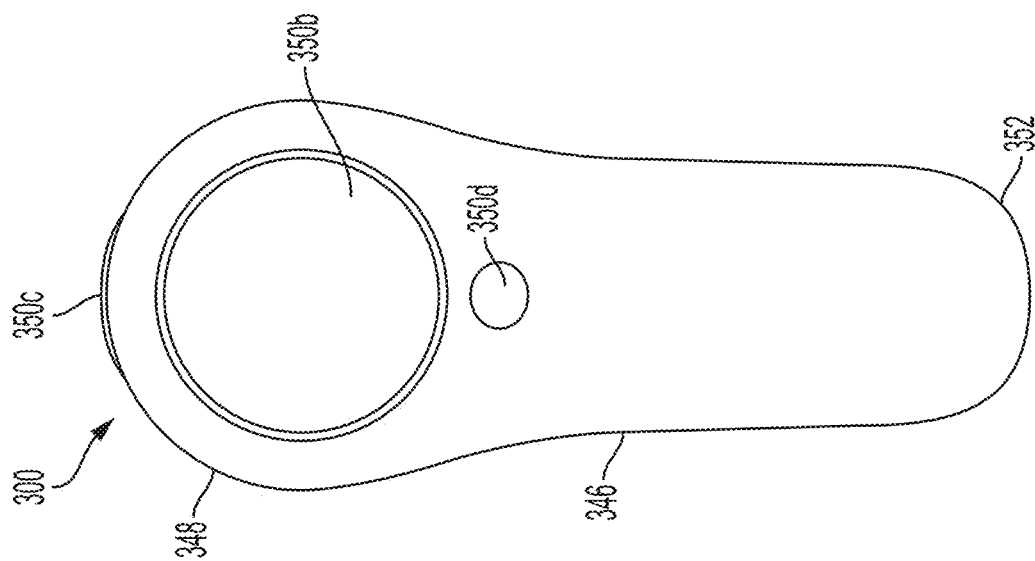
Figure 2C:
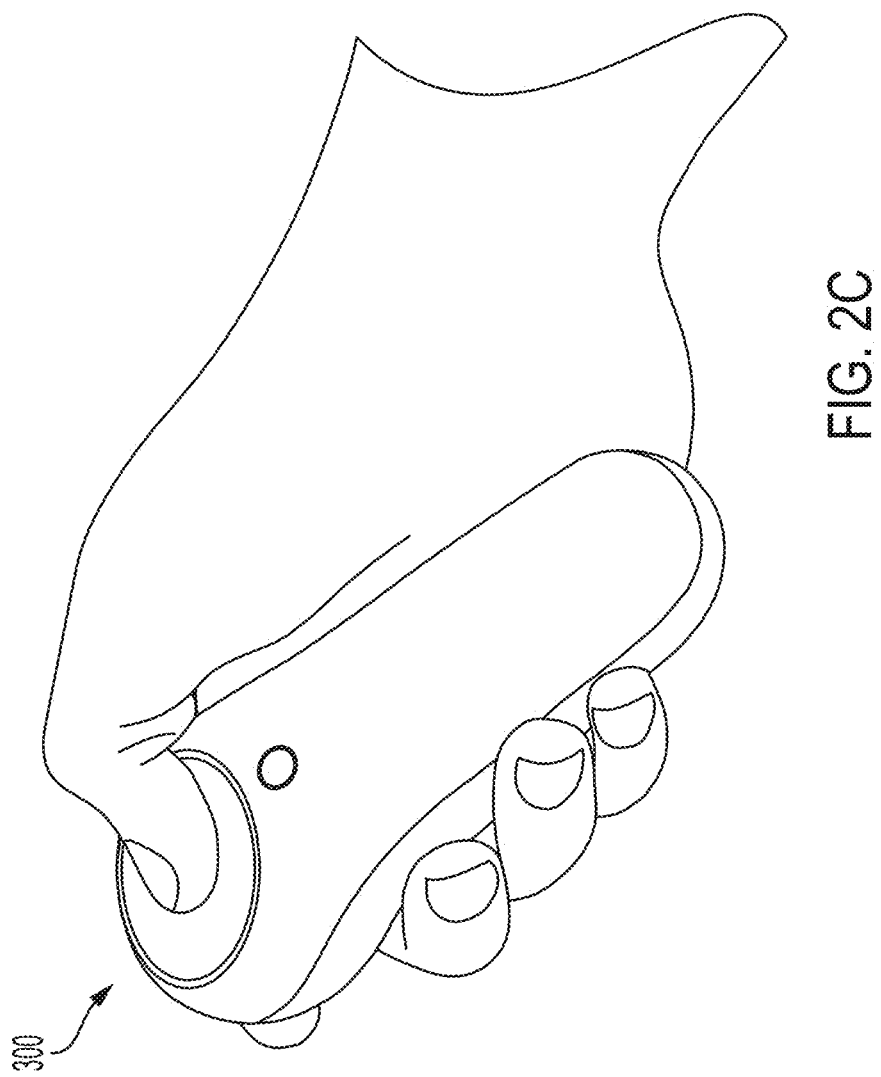

FIGS. 2A-2C illustrate an example handheld controller component 300 of a wearable system 200. More specifically, FIGS. 2A and 2B depict front (user-facing) and side views of the handheld controller 300, respectively, and FIG. 2C depicts the handheld controller 300 as held in a user's hand. The handheld controller 300 can be sized and shaped so as to be handheld. Further examples of user input devices that may serve as user input devices (such as, e.g., handheld controllers) in one or more of the various embodiments disclosed herein are shown and described in U.S. patent application Ser. No. 15/683,677, U.S. patent application Ser. No. 15/965,696, and U.S. patent application Ser. No. 15/965,702, with ornamental appearances the same as or similar to the handheld controller of U.S. Design patent application Ser. No. 29/575,031, all of which are hereby incorporated by reference herein in their entireties.

The handheld controller 300 shown in FIGS. 2A-2C can include a body 346 having a plurality of user-input elements 350 that are configured to accept tactile user inputs (e.g., by being pulled, depressed, or touched, respectively). For example, the plurality of user-input elements 350 may include a trigger 350a, a home button 350d, a touchpad 350b, and a bumper 350c, although more or fewer buttons, triggers, or features can be included in other example handheld controllers. The body 346 of the handheld controller 300 may comprise an elongated cylinder, which may angle outward towards the top of the handheld controller 300 so that it is more frustoconical in shape (which may make it easier or more comfortable to be held in the user's hand). In some implementations, the body 346 may include indentations for the user's fingers, which may assist in gripping and holding the handheld controller 300. In some examples, the body 346 is ovoid in shape so that it may fit more in the palm of a user's hand or be more stable when put on a surface (e.g., a table). Other shapes for the body 346 are possible such as an elongated body having a cross-section that is oval, polygonal, etc. The cross-section of the body 346 may be substantially symmetric so that the handheld controller 300 can be easily held in the user's left hand or the user's right hand.

The body 346 can include an upper portion 348 which can include the trigger 350a, the touchpad 350b, and the bumper 350c. The body 346 can also include a bottom portion 352. The touchpad 350b can be angled so that the surface of the touchpad 350b is easily viewable by the user, when the handheld controller 300 is held in the user's hand. The angle of the touchpad 350b to the horizontal can be in a range from about 10-60 degrees. It follows that the body 346 can take on a more frustoconical shape by virtue of such an angle. As mentioned above, this shape may make the handheld controller 300 easier or more comfortable for the user to hold in their hand. In some embodiments, the angle of the touchpad 350b to the horizontal can be in a range from about 15-30 degrees. The trigger 350a can be disposed opposite to the touchpad 350b so that it is easily depressible with the user's index finger, when the handheld controller 300 is held in the user's hand.

The trigger 350a can be located on the upper portion 348 of the handheld controller body 346 that faces away from the user. The trigger 350a can include a touch surface and a touch sensor, which can receive a user input. A touch sensor can sense a user's finger on (or near) the touch surface of the trigger 350a and the movement of the user's finger on the touch surface of the trigger 350a. Additionally or alternatively, the trigger 350a can include a button which the user can press. Such a button can include a pressure sensor which can detect when a user presses the button. The button may be pressed 6-8 mm from its resting position. In some embodiments, the trigger 350a can include multiple buttons such as, e.g., select, back, option, etc. A user can actuate the trigger 350a using various hand gestures. For example, the user can actuate the trigger 350a by touching, swiping, tapping, pressing, etc. The trigger 350a can provide rich touch features where various user interface interactions may be associated with different hand gestures used to actuate the trigger 350a. In some implementations, some or all of the above-described functionality of the trigger 350a can be implemented by other buttons or touch-sensitive surfaces of the handheld controller 300.

The handheld controller can include a touchpad 350b located on the upper front portion 348 of the handheld controller body 346 that faces toward the user. The touchpad 350b can include a touch surface. The touch surface can further include multiple interactable regions, with each region being mapped to a type of user input (or a user interface operation). The touch surface may be a circular surface with a diameter in the range of 27 mm-40 mm. The touch surface may also be other shapes, such as, e.g., oval, rectangle, triangle, diamond, irregular, etc. In some implementations, the touch surface can be substantially surrounded by a light guide. The touchpad 350b can include a force-haptic component underneath the touch surface. The force-haptic component can include a haptic actuator for providing haptic feedback to a user via the touch surface or light guide. The force-haptic component can also include a touch detector for detecting a user's actuation of the touchpad.

The handheld controller 300 can include a button 350c (referred to as a bumper) that in the example shown in FIG. 17B is located at the front end of the handheld controller 300, above the trigger 350a and below the touchpad 350b. The bumper 350c may provide an ergonomically comfortable place for the user to rest his or her forefinger. The bumper 350c can comprise a touch sensitive surface implemented as, e.g., a depressible button, a capacitive touch sensor, a force-haptic element, etc.

The handheld controller 300 can include a home button 350d. The home button 350d can be located on the body 346 of the handheld controller 300. In various embodiments, the handheld controller 300 includes a home button 350d, a bumper 350c, and a trigger 350a, or includes only one or two of these user-input elements. The handheld controller 300 can be configured or shaped differently than shown. For example, the home button 350d may be implemented as part of the trigger 350a or the bumper 350c (rather than as part of the body 346).

As shown in FIG. 2C, the user can actuate the plurality of user-input elements 350 of the handheld controller 300 primarily using three fingers, e.g., the thumb to actuate the home button 350d or the touchpad 350b, the forefinger to actuate the bumper 350c, and the middle finger to actuate the trigger 350a. Such a three-finger actuatable handheld controller can permit the user to rapidly and efficiently provide user input without excessive and tiring use of just one finger (as may occur with mouse setups for desktop computers).

The plurality of user-input elements 350 of the handheld controller 300 can support various input techniques such as, e.g., touching, swiping, scrolling, rotary dialing, clicking, pressing, d-pad emulation, etc. In some examples, the handheld controller 300 can support inertial swipes. A user can actuate the handheld controller 300 using various hand gestures and body poses. For example, a user can swipe or touch the touchpad 350b or the trigger 350a. In some implementations, one or more haptic actuators may be provided in the handheld controller 300. For example, one or more haptic actuators may be located at the trigger 350a, the touchpad 350b, and/or the handheld controller body 346.

In some examples, some or all of the plurality of user-input elements 350 may be configured for use as an optical tracking target, e.g., for tracking six-degree-of-freedom (6DOF) motion of the handheld controller 300, in conjunction with a camera or other optical sensor (which in some examples may be mounted in wearable head unit 200. In some examples, handheld controller 300 includes tracking components (e.g., an IMU, radar sensors (including transmitting and/or receiving antennas), or other suitable sensors or circuitry), for detecting position or orientation, such as position or orientation relative to a wearable head unit or a belt pack. In some examples, such tracking components may be positioned in one or more portions of the handheld controller 300 and facing out of one or more surfaces thereof, and/or may be mechanically coupled to the handheld controller 300. Handheld controller 300 can be configured to provide one or more output signals corresponding to one or more of a state of one or more of the plurality of user-input elements 350; or a position, orientation, and/or motion of the handheld controller 300 (e.g., via an IMU). Such output signals may be used as input to a processor of wearable head unit 200, of handheld controller 300, or of another component of a wearable system (e.g., a wearable mixed reality system). Such input may correspond to a position, orientation, and/or movement of the handheld controller (and, by extension, to a position, orientation, and/or movement of a hand of a user holding the controller). Such input may also correspond to a user interacting with one or more of the plurality of user-input elements 350.

The handheld controller 300 can include a variety of additional components, at least some of which may be disposed inside the body 346 of the handheld controller 300. These components can include one or more environmental sensors, batteries, communication interfaces, haptic actuators, and hardware processors. The one or more communication interfaces may include a network interface configured to establish a connection and communicate with the target object via a network. The network may be a LAN, a WAN, a peer-to-peer network, radio frequency, Bluetooth, Wi-Fi, a cloud based network, or any other type of communication network. For example, the handheld controller 300 and the wearable head unit 200 may be paired using a wireless communication protocol such as, e.g., Bluetooth Low Energy (BLE).

In some examples, handheld controller 300 can include at least one hardware processor, along with a memory and/or other suitable computer system components. The handheld controller 300 may include at least one hardware processor configured to communicate with, control, and/or process data acquired by some or all of the tracking components and the one or more environmental sensors. The at least one hardware processor can also receive from and send data to another device (such as the wearable head unit 200 or another paired device) via the one or more communications interfaces. In some embodiments, the at least one hardware processor may work in conjunction with another computing device (such as, e.g., the wearable device, a remote server, or a personal computer) to analyze data. The at least one hardware processor can process various user inputs from the user's actuation of the handheld controller 300. For example, the at least one hardware processor can process user inputs on one or more of the plurality of user-input elements 350, such as the touchpad 350b, the trigger 350a, the home button 350d, the bumper 350c, etc., as described above. As an example, the at least one hardware processor can detect a user's hand gesture on the touchpad 350b by processing signals from the touch sensors. Such a processor can also be used to execute any other suitable process disclosed herein.

Figure 3:
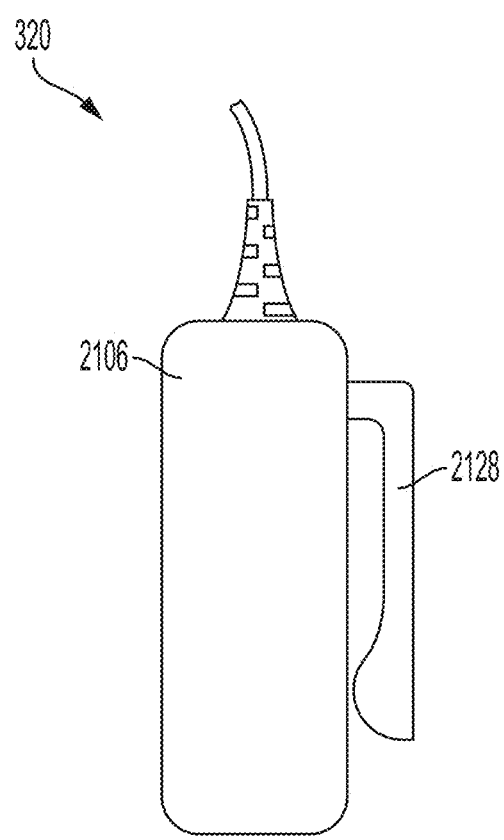
FIG. 3 illustrates an example auxiliary unit that can be used in conjunction with an example wearable system according to examples of the disclosure.

FIG. 3 illustrates an example auxiliary unit 320 of a wearable system, such as a wearable mixed reality system. The auxiliary unit 320 can include, for example, one or more batteries to provide energy to operate the wearable head unit 200 and/or handheld controller 300, including displays and/or acoustic structures within those components; a processor (which may execute any suitable process disclosed herein); a memory; or any other suitable components of a wearable system. Compared to wearable head units (e.g., wearable head unit 200) or handheld units (e.g., handheld controller 300), auxiliary unit 320 may be better suited for housing large or heavy components (e.g., batteries), as it may more easily be positioned on parts of a user's body, such as the waist or back, that are comparatively strong and less easily fatigued by heavy items.

In some examples, sensing and/or tracking components may be positioned in auxiliary unit 320. Such components can include, for instance, one or more IMUs and/or radar sensors (including transmitting and/or receiving antennas). In some examples, the auxiliary unit 320 can use such components to determine the positions and/or orientations (e.g., 6DOF locations) of handheld controller 300; the wearable head unit 200; or the auxiliary unit itself. As shown the example auxiliary unit 320 includes a clip 2128 for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head unit 200 through a multiconduit cable that can, for example, include electrical wires and fiber optics. Wireless connections to and from the auxiliary unit 320 can also be used (e.g., Bluetooth, Wi-Fi, or any other wireless technology).

Figure 4:
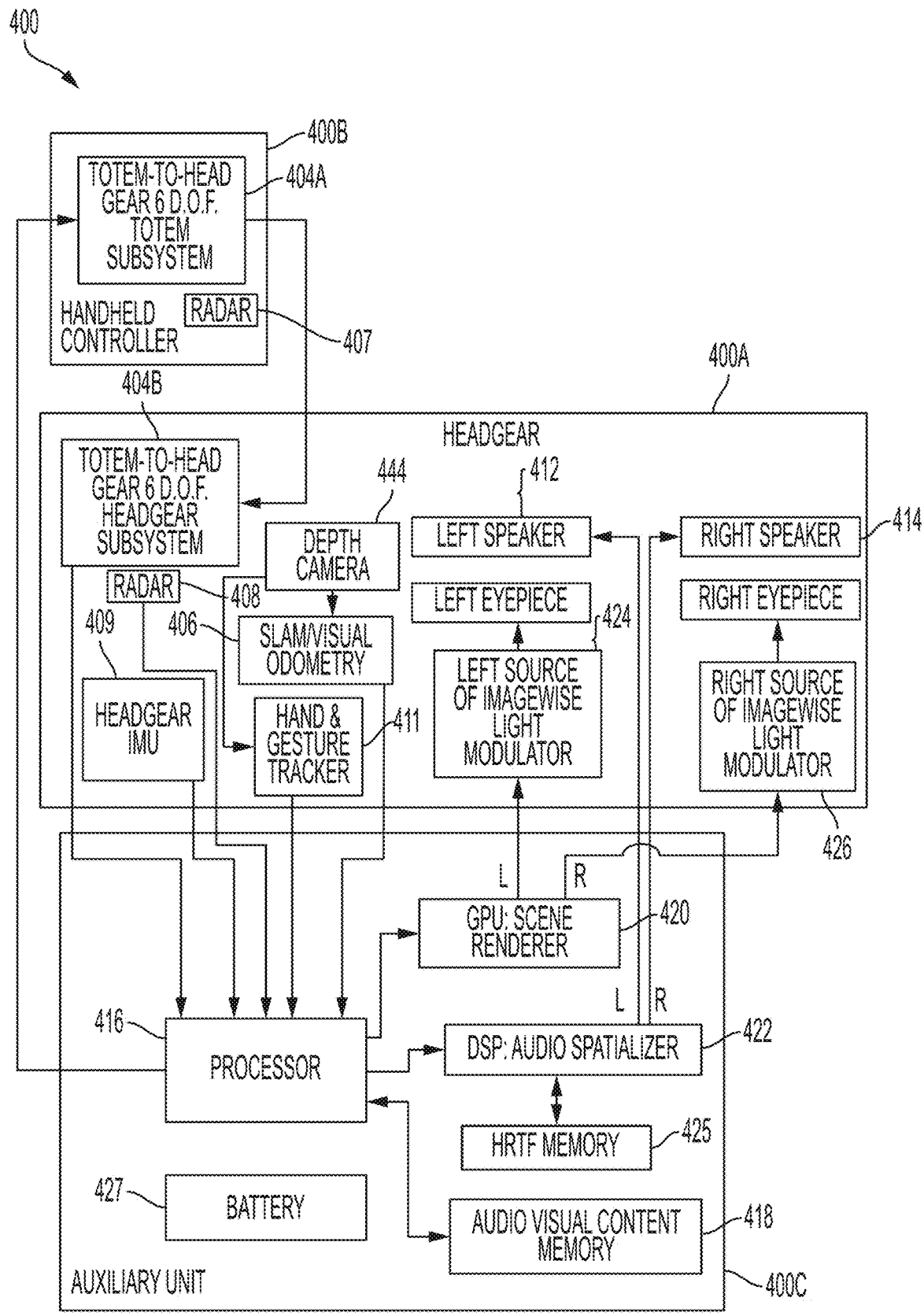
FIG. 4 illustrates an example functional block diagram for an example wearable system according to one or more examples of the disclosure.

FIG. 4 shows an example functional block diagram that may correspond to an example mixed reality system (e.g., a mixed reality system including one or more of the components described above with respect to FIGS. 1-3). As shown in FIG. 4, example handheld controller 400B (which may correspond to handheld controller 300 (a "totem")) includes a totem-to-headgear six degree of freedom (6DOF) totem subsystem 404A and one or more radar sensors 407 (which can include transmitting and/or receiving antennas); and example augmented reality headgear 400A (which may correspond to wearable head unit 200) includes a totem-to-headgear 6DOF headgear subsystem 404B. In the example, the 6DOF totem subsystem 404A and the 6DOF headgear subsystem 404B cooperate to determine six coordinates (e.g., offsets in three translation directions and rotation along three axes) of the handheld controller 400B relative to the augmented reality headgear 400A. The six degrees of freedom (6DOF) may be expressed relative to a coordinate system of the headgear 400A. The three translation offsets may be expressed as X, Y, and Z offsets in such a coordinate system, as a translation matrix, or as some other representation. These Cartesian coordinates (e.g., location) can be determined though radar detection techniques (e.g., as described in further detail below). The rotation degrees of freedom may be expressed as sequence of yaw, pitch, and roll rotations, as a rotation matrix, as a quaternion, or as some other representation.

In some examples, radar sensor 407 included in handheld controller 400B can comprise an antenna, or an array of multiple antennas, configured to transmit signals having specific radiation patterns (e.g., unique wave polarizations as described below) and at distinct frequencies that can be received by radar sensor 408 in the wearable head unit 400A and used for 6DOF tracking (e.g., as described in further detail below). Additionally, one or more system components (e.g., wearable head unit 400A, handheld controller 400B, and/or auxiliary unit 400C) can include an Inertial Measurement Unit (IMU), accelerometer, gyroscope, or other sensor that can enhance orientation tracking, such as described below.

In some examples, the wearable head unit 400A; one or more depth cameras 444 (and/or one or more non-depth cameras) included in the wearable head unit 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head unit 400A can include an optical target for optical tracking in conjunction with the camera.

In some examples, it may become necessary to transform coordinates from a local coordinate space (e.g., a coordinate space fixed relative to wearable head unit 400A) to an inertial coordinate space (e.g., a coordinate space fixed relative to the real environment). For instance, such transformations may be necessary for a display of wearable head unit 400A to present a virtual object at an expected position and orientation relative to the real environment (e.g., a virtual person sitting in a real chair, facing forward, regardless of the headgear's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head unit 400A shifts and rotates). In some examples, a compensatory transformation between coordinate spaces can be determined by processing imagery from the depth cameras 444 using a SLAM and/or visual odometry procedure in order to determine the transformation of the headgear relative to a coordinate system. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and a real coordinate space. Similarly, in some examples, an additional source of information on the user's head pose and location is obtained from IMU 409 (or another suitable sensor, such as an accelerometer or gyroscope). Information from IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of wearable head unit 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head unit's headgear subsystem 404B, the radar sensor 408, the IMU 409, the SLAM/visual odometry block 406, depth cameras 444, a microphone 450; and/or the hand gesture tracker 411. The processor 416 can also send and receive control signals from the totem system 404A. The processor 416 may be coupled to the totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light

426. GPU 420 can output stereoscopic image data to the sources of imagewise modulated light 424, 426. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described above). The auxiliary unit 400C may include a battery 427 to power its components and/or to supply power to another system component, such as wearable head unit 400A and/or handheld controller 400B. Including such components in an auxiliary unit, which can be mounted to a user's waist, can limit the size and weight of wearable head unit 400A, which can in turn reduce fatigue of a user's head and neck.

While FIG. 4 presents elements corresponding to various components of an example mixed reality system, various other suitable arrangements of these components will become apparent to those skilled in the art. For example, elements presented in FIG. 4 as being associated with auxiliary unit 400C could instead be associated with wearable head unit 400A and/or handheld controller 400B. Furthermore, some mixed reality systems may forgo entirely a handheld controller 400B or auxiliary unit 400C. Such changes and modifications are to be understood as being included within the scope of the disclosed examples.

Device Tracking

For many applications of wearable systems such as described above, it can be desirable to track the position and orientation (e.g., the 6DOF location) of one or more components of a wearable system (e.g., wearable head unit 200, handheld controller 300, or auxiliary unit 320 described above) with respect to another such component. Further, as described above, it is desirable to perform such location tracking with relatively high accuracy and low latency; without requiring a tether or a base station; and with a minimum of power consumption. It is further desirable for location tracking to accommodate the wide variety of environments (including sunlit outdoor environments) that may be encountered by wearable systems.

Radar sensors, though they may be relatively uncommon in consumer-level devices, offer several of the above advantages over other sensors, and may prove useful for tracking components of wearable systems. For example, radar sensors are relatively insensitive to light, can be implemented in small form-factor devices, and can offer relatively high accuracy and low latency while consuming relatively low amounts of power. Furthermore, some users may have fewer privacy concerns with radar sensors than with cameras and other sensors configured to capture images. Radar sensors generally operate according to the principle that an electromagnetically opaque object will reflect (echo) an electromagnetic signal. A radar sensor can include a transmitter and/or receiver (which may or may not be housed in a single unit). The transmitter can emit a radio signal; objects in space that the signal collides with can reflect the radio signal, and the reflected signal may be detected by the receiver. The distance of the object from the transmitter and receiver can be computed by simple triangulation based on the time of flight of the reflected signal (i.e., the difference between the time of transmission and the time of reception); the known velocity of the radio signal; and the relative positions of the transmitter and receiver. Furthermore, a velocity of the object can be computed based on a change in the frequency of the received signal compared to the frequency of the transmitted signal, which can be attributed to Doppler effects of the moving object on the received signal.

In some cases, the radar transmitter and radar receiver may be collocated at the same general position. However, signal interference generally restricts a radar unit from transmitting and receiving radio signals at the same time. Accordingly, for radar systems featuring a collocated transmitter and receiver, the system may alternate between a transmitting mode, in which the radio signal is emitted, and a receiving mode, in which the system listens for a reflected signal. The need to switch between these two modes can be avoided altogether by placing the radar receiver at a different location than the radar transmitter.

While radar transmitters may emit radio signals anisotropically, with signal power evenly distributed in all directions, radar transmitters more commonly emit directional radio signals, with the power of the signal oriented along an axis of signal propagation. Similarly, radar receivers can include one or more directional antennas, configured to receive signals polarized along an axis. Such directional transmitters and receivers can improve energy efficiency by focusing signal power in a direction of interest. But perhaps more significantly, emitting a focused signal in a known direction allows the determination of not just the distance of a reflective object, but its coordinates in three-dimensional space—that is, its distance from the transmitter along the direction vector of signal propagation. In one canonical use of radar the 360-degree detection of ranged aircraft—a radar transmitter at a fixed position emits a powerful and highly directional signal, as the transmitter itself rotates to rotate the signal propagation vector around the transmitter's vertical axis. The "ping" generated as the emitted signal reflects off of a reflective object, such as an airplane, indicates that the object is located along the vector of the signal transmission, at a distance easily determined by the time of flight of the signal, and traveling at a velocity determined by the Doppler shift of the received signal. That these determinations can be made quickly, reliably, and efficiently, even in the presence of hostile physical environments, accounts for the rapid adoption of radar during World War II, and for its continued usage today—in relatively unchanged form—in defense, aviation, marine, and astronautical applications.

The same principles that make radar a robust and durable tracking technology for aircraft also make it an attractive candidate for positioning systems in wearable devices. However, adapting radar sensors to wearable devices presents some challenges that are not present in some conventional uses of radar. For instance, wearable devices, particularly those designed to be worn on the head, are generally mobile, and are subject to the movements and rotations of the human body. The disclosure presents systems and methods for overcoming these problems and adapting radar technologies for tracking wearable system components.

Figure 5A:
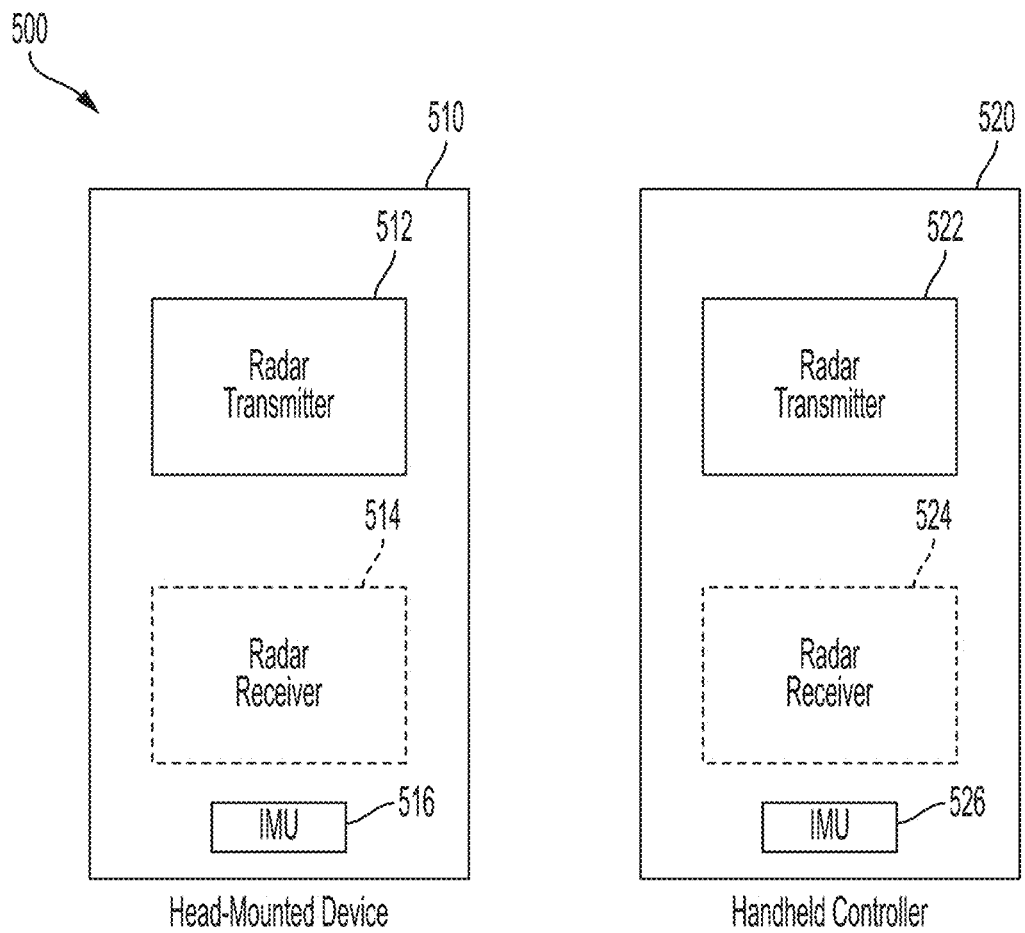
FIG. 5A illustrates an example wearable system configured to track a second system component using a first system component, via a radar sensor, according to examples of the disclosure.

FIG. 5A illustrates an example wearable system 500 outfitted with a radar sensor (transmitter and/or receiver) in each of two components of the wearable system. In the example shown, a first component 510 (e.g., a wearable head unit, which may correspond to wearable head unit 200) includes a first radar transmitter 512 and a collocated first radar receiver 514; and a second component 520 (e.g., a handheld controller, which may correspond to handheld controller 300) includes a second radar transmitter 522 and, optionally, a collocated second radar receiver 524. These system components are configured such that the first radar transmitter 512 can emit a first radio signal, whose reflections can be received by the first radar receiver 514 to determine a position of the second component 520 relative to the first component 510, as described in more detail below. The first radar receiver 514 is further configured to detect one or more radio signals emitted by the second radar transmitter 522. Second radar receiver 524 may be included for some applications, such as where the second component 520 is desired to track the first component 510; however, in some examples, second radar receiver 524 can be omitted, such that second component 520 comprises a transmit-only radar unit. Moreover, as described above with respect to FIG. 4, the first component 510 and/or second component 520 can include one or more IMUs (516 and 526, respectively), or other suitable orientation sensors, to enhance the determinations made based on radar sensor input.

Figure 5B:
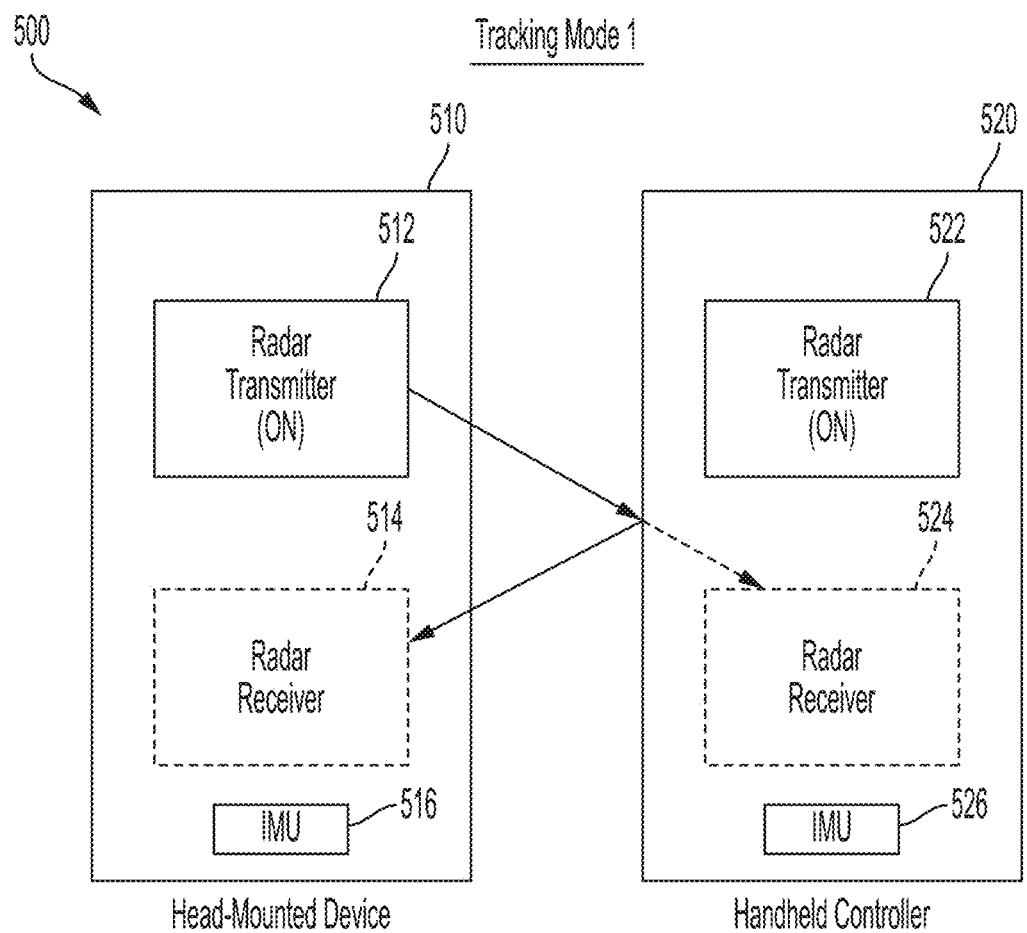
FIGS. 5B and 5C illustrate the example wearable system of FIG. 5A operating in each of two different tracking modes according to examples of the disclosure.

FIG. 5B illustrates the example wearable system 500 operating in a first tracking mode, (also referred to herein more simply as the "first mode"). In the first tracking mode, the first radar transmitter 512 of the first component 510 is on or otherwise activated, while the second radar transmitter 522 of the second component 520 is off or otherwise inactive. As depicted in FIG. 5B, in the first tracking mode, the first radar transmitter 512 of the first component 510 is configured to emit a first radio signal, and the first radar receiver 514 of the first component 510 is configured to receive one or more portions of the first radio signal as reflected off of the second component 520. The first component 510 may analyze such reflections of the first radio signal to determine one or more characteristics (e.g., a position, distance, angle of arrival, etc.) of the second component 520 relative to the first component 510. In some situations, after emitting the first radio signal, the first component 510 may also receive one or more portions of the first radio signal as reflected off of one or more objects other than the second component 520, such as the user's hand and/or fingers and other physical objects in the environment of the first component 510. In some implementations, the first component 510 may be configured to distinguish portions of the first radio signal as reflected off of the second component 520 received after emitting the first radio signal from portions of the first radio signal as reflected off of one or more objects other than the second component 520. As described in further detail below, in these implementations, the first component 510 may be configured to identify and isolate one or more portions of the received reflections of the first radio signal that correspond to a radar signature of the second component 520, and then analyze the one or more identified portions of the received reflections to determine one or more characteristics (e.g., a position, distance, angle of arrival, etc.) of the second component 520 relative to the first component 510.

The radar signature of the second component 520 may at least in part depend on the radar reflection characteristics of the physical housing structure of the second component 520, the subcomponents contained within or attached to the physical housing structure of the second component 520, or a combination thereof. In some implementations, one or more portions of the physical housing structure of the second component 520 and/or one or more subcomponents contained within or attached to the physical housing structure of the second component 520 may be configured to reflect radar signals incident thereon (e.g., the first radio signal) in a relatively unique or distinctive manner. In this way, the radar signature of the second component 520 may be more readily recognizable to the first component 510. For example, in these implementations, one or more portions of the physical housing structure of the second component 520 and/or one or more subcomponents of contained within or attached to the physical housing structure of the second component 520 may be constructed out of radar reflective materials, radar absorbent materials, or a combination thereof. In some examples, such one or more subcomponents of the second component 520 may include one or more radar reflectors, such as one or more retroreflectors (e.g., corner reflectors, cat's eye reflectors, phase-conjugate reflectors, etc.), nonlinear radar reflectors, and the like. In such implementations, one or more nonlinear radar reflectors may include one or more passive or active mixing radar reflectors including one or more mixing elements (e.g., diodes and/or other nonlinear junctions) and antenna elements (e.g., wire leads or other elements electrically coupled to the one or more mixing elements) configured to backscatter or otherwise modulate and re-emit radar signals incident thereon in a particular manner. For example, the second component 520 may include one or more mixing radar reflectors that, when irradiated with one or more radar signals of a first frequency ($f_1$), are configured to backscatter or re-emit such one or more radar signals at one or more harmonics of the first frequency (e.g., $2f_1$, $3f_1$, and so on). In another example, the second component 520 may include one or more mixing radar reflectors that, when irradiated with one or more radar signals of a first frequency ($f_1$) and one or more radar signals of a second frequency ($f_1$), are configured to backscatter or re-emit such one or more radar signals at one or more intermodulation frequencies of the first and second frequencies (e.g., $2f_1-f_2$). It follows that, in at least some of these implementations, the radar signature of the second component 520 may correspond to one or more radar signals at one or more harmonic and/or intermodulation frequencies of one or more frequency components of the first radio signal emitted by the first component 510.

In some examples, one or more radar reflectors (e.g., retroreflectors, nonlinear radar reflectors, etc.) may be strategically placed in or on the physical housing structure of the second component 520 to minimize the likelihood of such subcomponents being obscured relative to the first component 510 by a hand and/or fingers of a user. For instance, in such examples, each of one or more radar reflectors may be disposed beneath or upon a portion of the physical housing structure of the second component 520 configured to remain unobscured by a user's hand and fingers under normal operation. For implementations in which the second component 520 corresponds to a handheld controller equivalent or similar to handheld controller 300, as described above with reference to FIGS. 2A-2C, such a portion of the physical housing structure of the second component 520 may correspond to a distal end of body 346, such as upper portion 348 or bottom portion 352. As depicted in FIG. 2C, some or all of upper portion 348 remains exposed when handheld controller 300 is held and operated by a user in a normal manner, as does some or all of bottom portion 352. For example, in these implementations, such a portion of the physical housing structure of the second component 520 may correspond to a region of upper portion 348 located between touchpad 350b and bumper 350c. As depicted in FIG. 2C, this region of the handheld controller 300 may not be obscured by a hand and/or fingers of a user when such a user holds the body 346 of handheld controller 300 in the palm of their hand with their thumb resting on touchpad 350b and their forefinger resting on trigger 350a or bumper 350c. In some examples, the second component 520 may include one or more radar reflectors disposed at upper portion 348, as well as one or more radar reflectors disposed at bottom portion 348. By placing one or more radar reflectors in such locations of the second component 520, the one or more radar reflectors may more often fall directly in the line of sight of the radar transmitter 512 and/or radar receiver 514 of the first component 510. In this way, the one or more radar reflectors may more readily receive and reflect radar signals emitted by the first component 510, which may boost the likelihood of being detected and recognized by the first component 510. In some implementations, one or more of the radar transmitter 522 and the radar receiver 524 may be disposed at such locations of the second component 520 for similar reasons. In some examples, one or more regions of upper portion 348 and/or bottom portion 352 may be constructed out of radar reflective materials, radar absorbent materials, or a combination thereof.

In some implementations, in the first tracking mode, the second component 520 may transmit data from IMU 526 to the first component 510 over one or more communication networks, such as Bluetooth, Wi-Fi, and other non-radar communication networks. Furthermore, for at least some implementations in which the second component 520 includes second radar receiver 524, in the first tracking mode, the second radar receiver 524 may receive one or more portions of the first radio signal emitted by the first radar transmitter 512. In such implementations, such portions of the first radio signal received by the second radar receiver 524 may be analyzed by the second component 520, the first component 510, or a combination thereof to determine one or more characteristics (e.g., an orientation, distance, etc.) of the first component 510 relative to the second component 520.

Figure 5C:
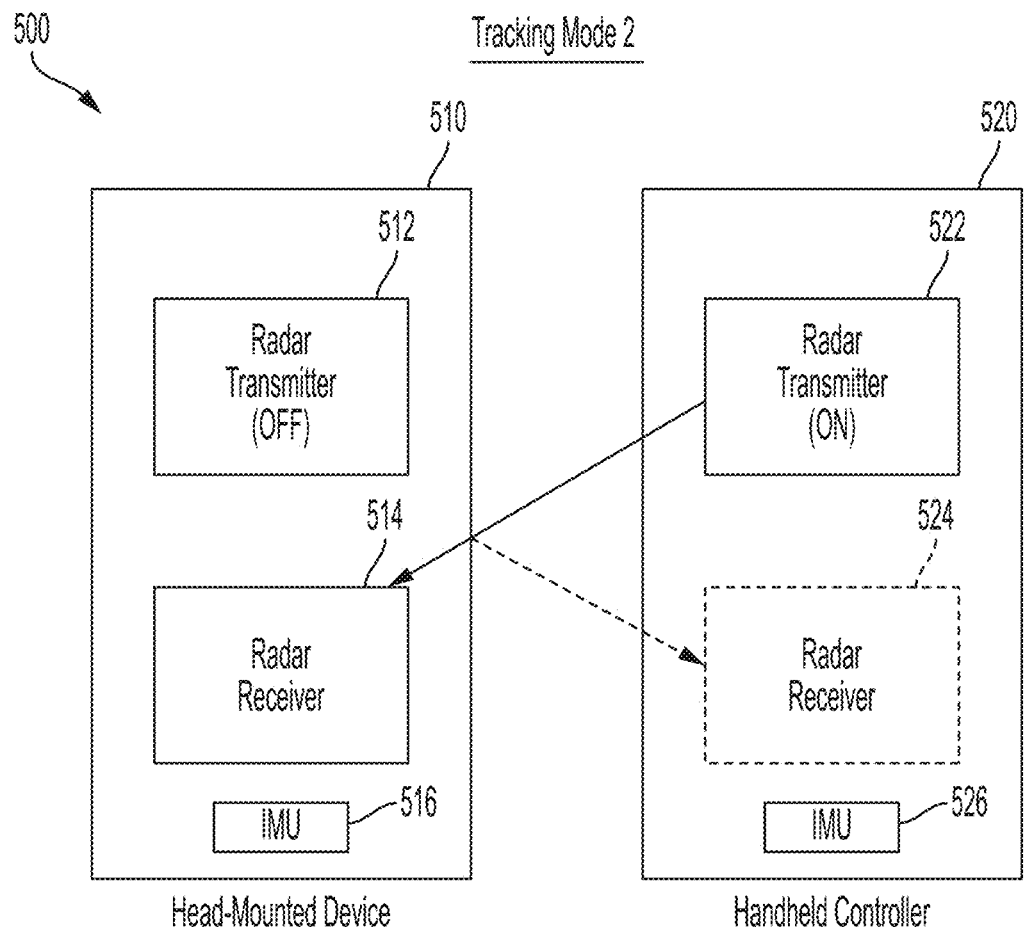

FIG. 5C illustrates the example wearable system 500 operating in a second tracking mode (also referred to herein more simply as the "second mode") different from the first tracking mode. In the second tracking mode, the second radar transmitter 522 of the second component 520 is on or otherwise activated, while the first radar transmitter 512 of the first component 510 is off or otherwise inactive. As depicted in FIG. 5C, in the second tracking mode, the second radar transmitter 522 of the second component 520 is configured to emit a second radio signal, and the first radar receiver 514 of the first component 510 is configured to receive one or more portions of the second radio signal from the second component 520. As described in further detail below, in some implementations, the second radar transmitter 522 can include an array of one or more antennas for transmitting radio signals. In these implementations, the first radar receiver 514 of the first component 510 can include an array of one or more antennas for receiving radio signals transmitted by the array of one or more antennas of the second radar transmitter 522 of the second component 520.

In the second tracking mode, the first component 510 may analyze such the second radio signal(s) emitted by the second radar transmitter 522 of the second component 520 to determine an orientation of the second component 520 relative to the first component 510. In some examples, in the second mode, the second component 520 may transmit data from IMU 526 to the first component 510 over one or more communication networks, such as Bluetooth, Wi-Fi, and other non-radar communication networks. The first component 510 may determine an orientation of the second component 520 relative to the first component 510 based at least in part on data from IMU 526, as received from the second component 520 in the first and/or second tracking modes. Furthermore, for at least some implementations in which the second component 520 includes second radar receiver 524, in the second tracking mode, the second radar receiver 524 may receive one or more portions of the second radio signal(s) as reflected off of the first component 510. In such implementations, such reflections of the second radio signal(s) received by the second radar receiver 524 may be analyzed by the second component 520, the first component 510, or a combination thereof to determine one or more characteristics (e.g., a position, distance, angle of arrival, etc.) of the first component 510 relative to the second component 520.

The example wearable system 500 may alternate between operating in the first and second tracking modes as illustrated in FIGS. 5B and 5C, respectively. In some implementations, the first and second radio signals emitted in the first and second tracking modes, respectively, may correspond to radio signals in one or more radar frequency bands, such as the millimetre band, "V" band, and/or "W" band. For example, the frequencies of one or both of the first and second radio signals may fall within a range of 1-300 GHz. In some examples, the frequencies of one or both of the first and second radio signals may fall within a range of 57-77 GHz (e.g., 57 GHz, 60 GHz, 64 GHz, and/or 77 GHz). In some implementations, the first and second components 510, 520 may also communicate with each other over one or more communication networks (e.g., Bluetooth, Wi-Fi, and other non-radar communication networks) in a manner so as to enable the first and second components 510, 520 to switch between tracking modes in unison. In example wearable system 500, the first component 510 and/or the second component 520 may each include one or more processors (e.g., CPUs, GPUs, DSPs) and/or one or more memories for performing the operations below based on radar signals transmitted and received by the radar sensors, and the outputs of various auxiliary sensors (e.g., IMUs 516 and 526). In some examples, the operations described herein for tracking wearable system components can be performed partially or entirely by the first component 510. In some examples, the operations below can be performed partially or entirely by the second component 520. In some examples, the operations below can be performed partially or entirely by a separate host device (not shown), such as an auxiliary wearable system component (e.g., auxiliary unit 320), a network server, a host computer, or another suitable device (or some combination of the above).

In FIGS. 5A-5C, the example wearable system is shown with a wearable head unit as the first component 510, and a handheld controller as the second component 520. However, any suitable components of a wearable system may be used as the first and second component 510, 520. For example, the first component 510 may be any of a wearable head unit (e.g., wearable head unit 200), a handheld controller (e.g., handheld controller 300), an auxiliary device (e.g., belt-mounted auxiliary pack 320), or any other suitable device. This first component 510 can be used to track the position and/or orientation of second component 520, which similarly may be any of a wearable head unit, handheld controller, auxiliary device, or any other suitable hardware. Further, in some implementations, the first component 510 and the second component 520 need not be different device types. For instance, in some examples, a handheld controller may track another handheld controller. While examples herein may refer to a wearable head unit as the first component 510 of wearable system 500, and a handheld controller as the second component 520 of the wearable system 500, this disclosure is not limited to such configurations and is intended to encompass all suitable configurations of hardware for wearable systems.

As mentioned above, in some implementations, the second radar transmitter 522 can include an array of one or more antennas for transmitting radio signals. This array may correspond to an array of one or more antennas of first radar receiver 514, which can be configured to receive the signals transmitted by second radar transmitter 522. While some antennas can be configured to transmit signals anisotropically, other antennas can be configured to transmit signals directionally—for example, by radiating the greatest signal power along an axis aligned with a propagation vector, with signal power attenuating with the angular and/or linear distance from that axis, as well as with the absolute distance from the antenna itself. A signal transmitted by a directional antenna can carry information about the position and orientation of the antenna with respect to the receiver. For instance, if a receiver detects a signal that was directionally transmitted along a propagation vector, the signal having a known maximum signal power, the amount of signal falloff (i.e., a ratio of the power of the received signal to the maximum signal power) can indicate the distance (angular and/or linear) of the receiver from the propagation vector. This principle can be used here to locate the second radar transmitter 522 of the second component 520 with respect to the first radar receiver 514 of the first component 510, such as mentioned above with reference to the second tracking mode depicted in FIG. 5C and described in further detail below.

FIGS. 6A-6D illustrate radiation patterns of radio signals that can be transmitted by an example antenna array of the second radar transmitter 522. As described above with reference to FIG. 5C, the second radar transmitter 522 may be configured to emit one or more radio signals in the second tracking mode. In some examples, such as shown in FIGS. 6A-6D, the second radar transmitter 522 includes an array of six directional antennas, centered at an origin coordinate, each configured to emit a polarized radio signal oriented along the direction vector of its respective antenna. In some examples, such as shown in the figures, the six directional antennas (and thus the respective radio signals they emit) are orthogonal, such that a first antenna 601 and a second antenna 602 of the array are oriented along an X axis; a third antenna 603 and a fourth antenna 604 of the array are oriented along a Y axis; and a fifth antenna 605 and a sixth antenna 606 of the array are oriented along a Z axis, where the X, Y, and Z axes are orthogonal to each other in three dimensional space and intersect at the origin coordinate. (However, other suitable antenna array configurations may be employed and are within the scope of this disclosure.) Signals transmitted by an antenna of the array can be modulated at a carrier frequency uniquely associated with that antenna, so that the signal can be demodulated and distinguished from other signals upon detection by a receiving antenna (e.g., an antenna of an antenna array of first radar receiver 514, which may correspond to the example antenna array of FIGS. 6A-6D). Furthermore, as mentioned above, signals transmitted by an antenna of the array can be polarized in accordance with the direction vector of that antenna, so that the polarization of the signal can be analyzed to determine the orientation of that antenna relative to the orientation of the corresponding receiving antenna. In this way, the carrier frequencies and polarizations of signals transmitted by some or all of the antennas of the array (e.g., antenna array of the second radar transmitter 522), as received by some or all of the antennas of the corresponding receiving antenna array (e.g., antenna array of the first radar receiver 514), may be at least in part indicative of the orientation of the transmitting antenna array relative to the corresponding receiving antenna array.

Figure 6A:
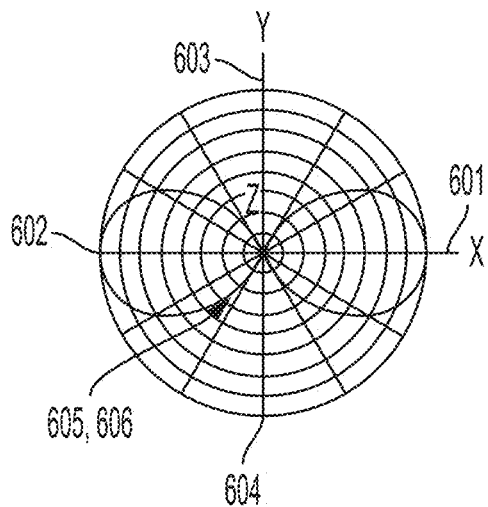
FIGS. 6A-6D illustrate example radiation patterns of an antenna array according to examples of the disclosure.
Figure 6B:
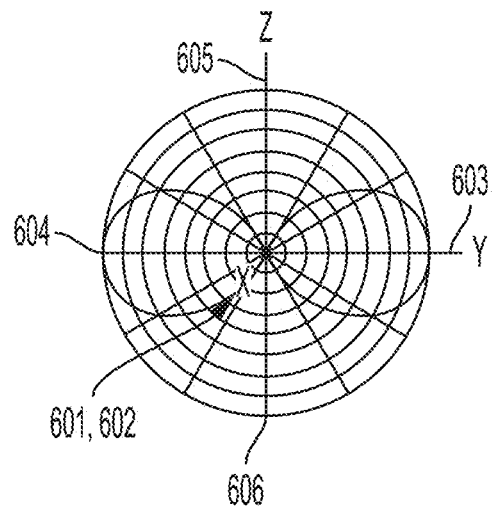
Figure 6C:
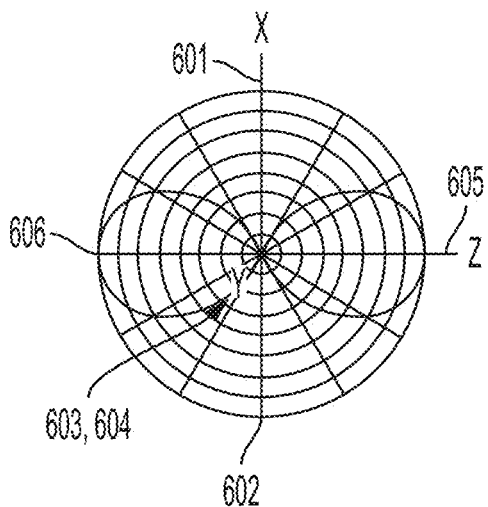
Figure 6D:
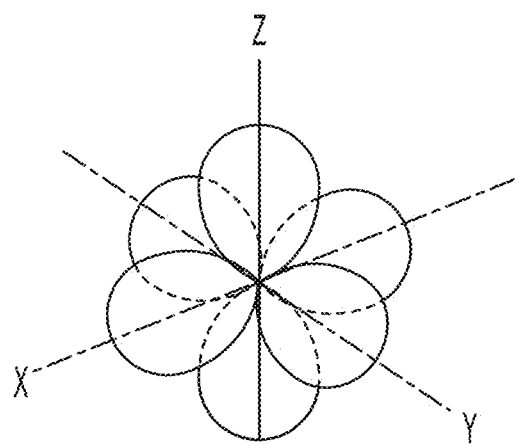

FIG. 6A shows an example radiation pattern of antenna 601 (oriented in a positive direction along the X axis) and antenna 602 (oriented in a negative direction along the X axis). As shown in the figure, an example signal transmitted by antenna 601 propagates in the direction of the positive X axis; the signal is highly directional, such that most of its power is focused along the positive X axis, with a steep falloff occurring with linear or angular distance from the X axis. Similarly, an example signal transmitted by antenna 602 propagates in the direction of the negative X axis, but otherwise can share the same directionality characteristics as signals transmitted by antenna 601. FIG. 6B shows example signals transmitted by antenna 603 and antenna 604 oriented along the positive Y axis and negative Y axis, respectively; and likewise, FIG. 6C shows example signals transmitted by antenna 605 and antenna 606 oriented along the positive Z axis and negative Z axis, respectively. FIG. 6D shows signals transmitted simultaneously by the six antennas 601 through 606. For each of the above transmitted signals and/or antennas, a radiation model can be determined that, given an input strength of a signal received by a receiver, can yield the propagation vector of the signal as it was transmitted by its respective antenna.

As described above, each signal can be modulated at a unique carrier frequency. For example, signals transmitted by antenna 601 can be modulated at a carrier frequency $\omega 1$; signals transmitted by antenna 602 can be modulated at a carrier frequency $\omega 2$; and so on. Accordingly, upon detecting a radio signal, a radar receiver (e.g., first radar receiver 514) can determine, from the modulation frequency of the signal, the antenna from which it was transmitted. The receiver can further determine the orientation of that antenna relative to the orientation of the receiver, for example by providing the relative strength of the received signal as input into the radiation model (which can yield the propagation vector of the transmitted signal, and thus an orientation of its transmitting antenna, with respect to the receiving antenna). By determining this information for a sufficient number of antennas of the antenna array, the orientation of the antenna array—and, thus, the system component (e.g., 520) to which the antenna array is attached—with respect to the receiver can be determined. This is described further below.

The directional radiation patterns shown in FIGS. 6A through 6D illustrate only several possible examples of radiation patterns that can be emitted by an antenna array of second radar transmitter 522. Many such radiation patterns exist such that one can recover the propagation vector from a detected signal. All suitable radiation patterns should be considered within the scope of the present disclosure.

Using a first wearable system component (e.g., wearable head unit 510) to determine a position and/or orientation of a second wearable system component (e.g., handheld controller 520) can proceed according to two tracking modes.

Referring once again to FIGS. 5A-5C, in the first tracking mode, a distance (e.g., in meters) and angle (e.g., angle of arrival in radians) of the second component 520 relative to the first component 510 can be determined. In the first mode, the first component 510 can transmit (via first radar transmitter 512) and receive (via first radar receiver 514) a radio signal which can reflect off of the second component 520; upon receiving the reflected signal, the distance and angle of arrival can be determined, as described in more detail below. In some examples, the radio signal can be anisotropic (e.g., where the location of the second component 520 relative to the first component 510 is entirely unknown). In some examples, the radio signal may have a directional radiation pattern. For instance, if the second component 520 is known to be in a general direction relative to the first component 510, the radio signal can have a radiation pattern oriented in that general direction. In the second tracking mode, an orientation (e.g., pitch, yaw, and roll in the coordinate space) of the second component 520 can be determined based in part on the results of the first tracking mode.

Figure 7:
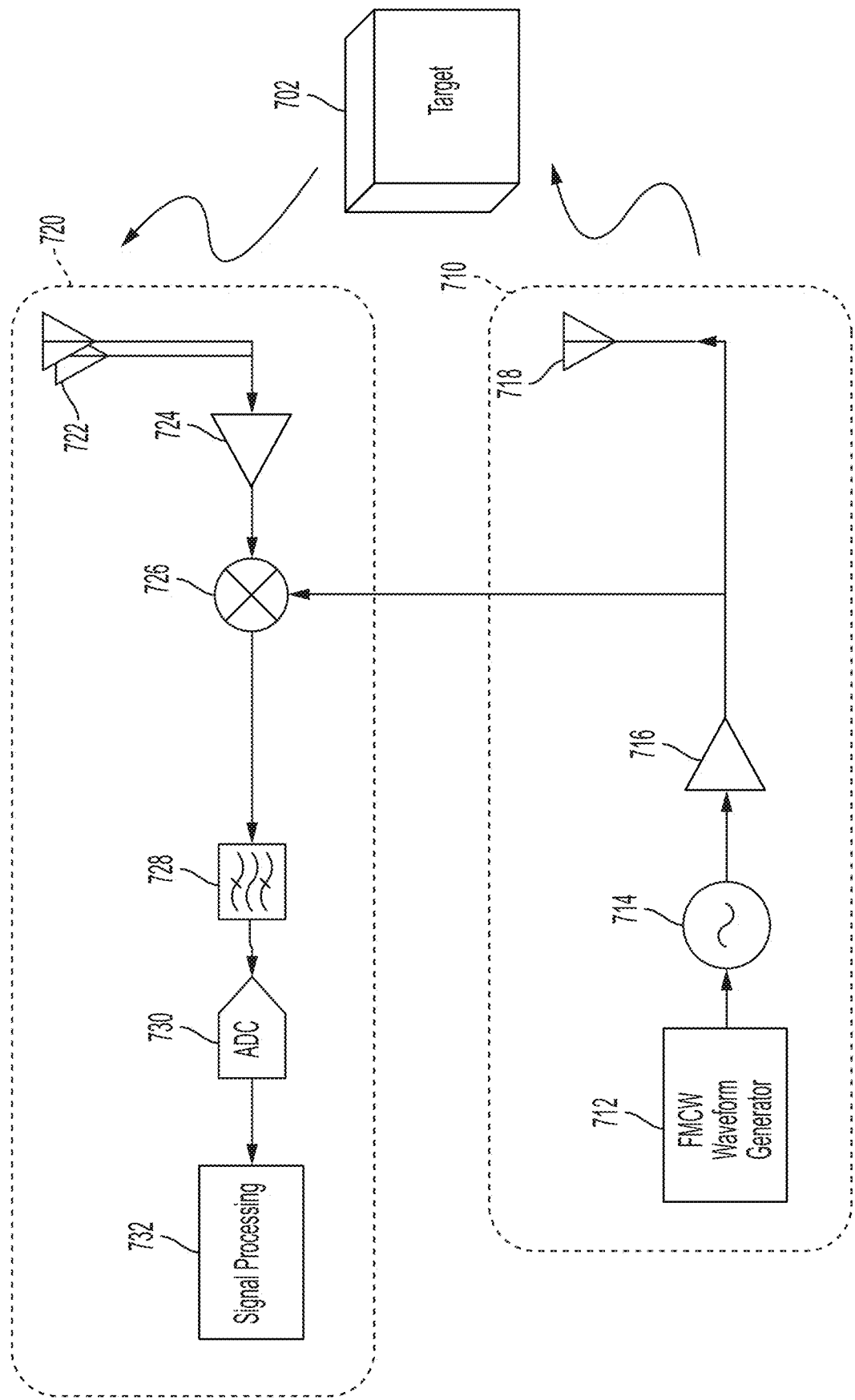
FIG. 7 illustrate example processes for transmitting and receiving radar signals, according to examples of the disclosure.

FIG. 7 shows a generalized block diagram of an example of transmitting and receiving signals. In the figure, an example transmission process 710 shows the transmission of a radio signal from a radar transmitter (e.g., first radar transmitter 512) to a target object (e.g., second component 520); and an example reception process 720 shows the reception of a radio signal (which may or may not correspond to the radio signal emitted by transmission process 710). However, any suitable configuration of transmitting and receiving radar signals can be used and should be considered within the scope of the disclosure.

Within the example transmission process 710, a waveform generator 712 and oscillator 714 can function in tandem to synthesize or generate a radio signal (e.g., a frequency-modulated continuous wave (FMCW) signal) for transmission. The transmission signal can be provided as input to amplifier 716 (which in some examples may be a buffer). The amplified or buffered signal is presented from an output of amplifier 716 to one or more antennas 718, from which the signal is emitted; and is also presented as input to downconverter 726 (described below with respect to reception process 720). From antennas 718, the emitted signal may reflect off of a target object 702, causing an echo signal.

Within the example reception process 720, a radio signal (which in the first tracking mode may correspond to the signal emitted at transmission process 710) can be detected by one or more antennas 722. The detected signal can be amplified or buffered at stage 724, and demodulated via downconverter 726. The signal can then be filtered (e.g., bandpass filtered) at stage 728, and converted to a digital signal by analog-digital converter 730, before being processed at signal processing stage 732, which can determine a location of target object 702 such as described below.

In some examples, during operation in the first tracking mode, described above, both transmission process 710 and reception process 720 are performed by the first component 510. That is, transmission process 710 can be performed by radar transmitter 512 of the first component 510; the radio signal can reflect off of target object 702 (which may be, e.g., the second component 520), and the reception process 720 can be performed by the radar receiver 514 of the first component 510. During operation in the second tracking mode, described above, the reception process 720 (but not the transmission process 710) is performed by the first component 510. At the reception process 720, instead of receiving reflected signals transmitted by the first component 510, as in the first tracking mode, the first component 510 receives directional radio signals emitted by an antenna array of the second component 520, such as described below. These signals may correspond to the radiation patterns described above with respect to FIGS. 6A-6D.

Figure 8:
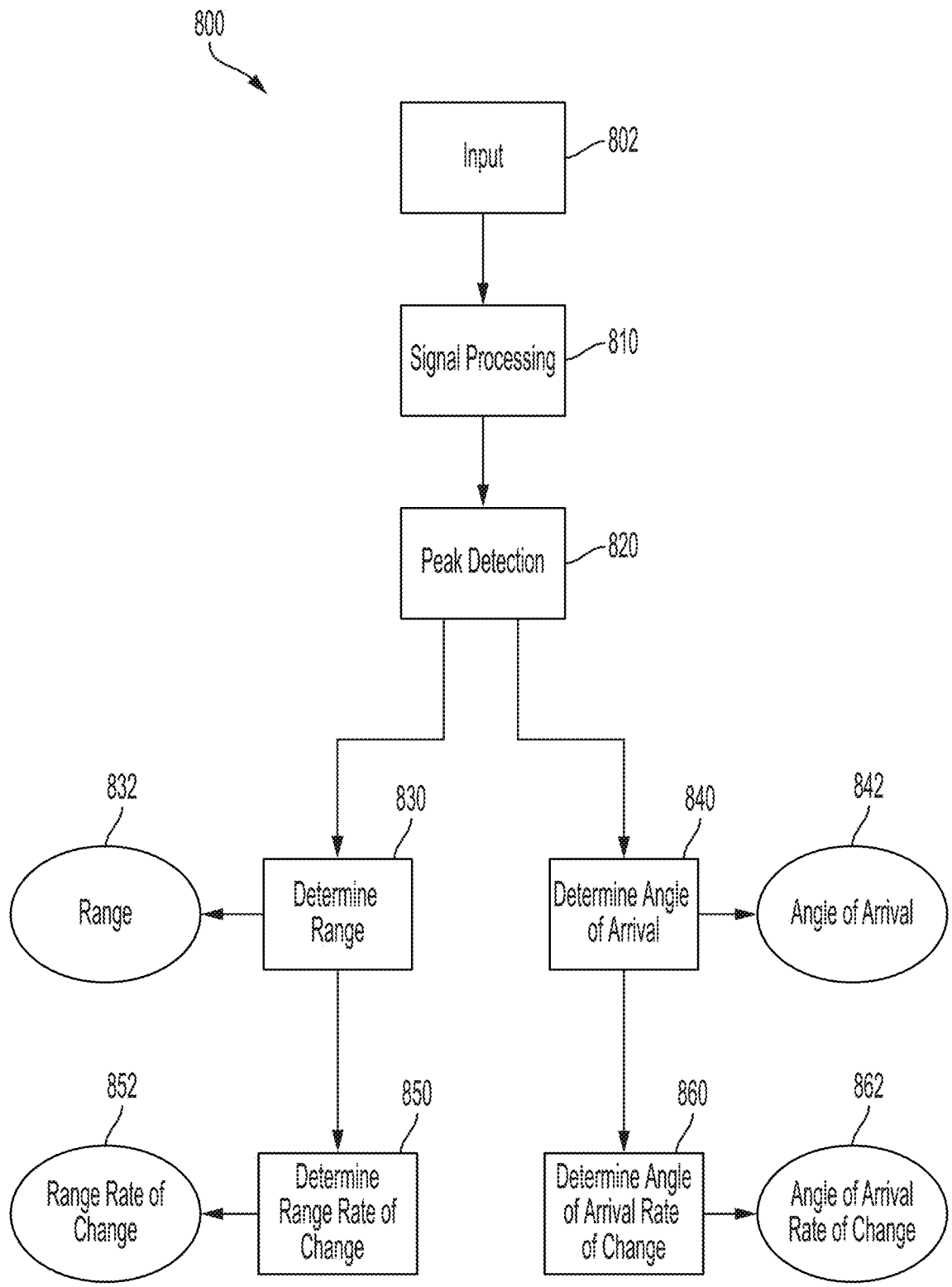
FIG. 8 illustrates an example process for determining a position of a second system component relative to a first system component, according to examples of the disclosure.

In the first tracking mode, detecting the distance and angle of the second component 520 relative to the first component 510 can proceed according to the example process 800 shown in FIG. 8. Some or all steps of process 800 may correspond to signal processing stage 732 described above with respect to FIG. 7; and may be implemented on the first component 510 using one or more CPUs, DSPs, or other suitable circuitry. As shown in FIG. 8, process 800 receives one or more inputs 802, which can correspond to digitizations of detected radar signals reflected off of a target object (e.g., second component 520 or target object 702), such as described above with respect to FIGS. 5A-5C and 7. Additionally, as mentioned above, in some situations, the one or more inputs 802 may also correspond to digitizations of detected radar signals reflected off of one or more objects other than the target object, such as a user's hand and/or fingers and other physical objects in the environment of the first component 510 (e.g., furniture, walls, appliances, etc.). The input signal can be processed as appropriate at stage 810; for example, the processing at stage 810 can include windowing the digital samples of the input signal; filtering the input signal; and applying a Fourier transform (e.g., a Fast Fourier Transform (FFT)) to yield a spectral representation of the input signal. Further, where input signal 802 comprises multiple modulated component signals (e.g., each corresponding to one or more antennas of an antenna array of second component 520, such as described above with respect to FIG. 6), signal processing stage 810 may demodulate the input signal 802 into its component signals, and separately process each coordinate signal.

As mentioned above with reference to FIG. 5B, in some examples, the first component 510 may be configured to distinguish portions of the input signal 802 that correspond to digitizations of detected radar signals reflected off of the target object from portions of the input signal 802 that correspond to digitizations of detected radar signals reflected off of one or more objects other than the target object. In these examples, processing at stage 810 can include identifying and isolating one or more portions of the input signal 802 that correspond to a radar signature of the target object (e.g., second component 520). In some implementations, one or more machine learning techniques may be leveraged in signal processing stage 810 so as to enable the first component 510 to recognize patterns in input signals that correlate with the target object (e.g., second component 520) with enhanced accuracy. Examples of machine learning architectures, paradigms, and techniques which may be employed in such implementations include learning classifier systems (e.g., random forest classifiers, deep learning techniques, etc.), support vector machines ("SVMs"), artificial neural networks, decision trees, rule-based systems, genetic algorithms, Bayesian networks, logistic regression models, Hidden Markov models, and other probabilistic statistical models. For example, the first component 510 may maintain or otherwise have access to a learning classifier system, such as a random forest classifier, having been pre-trained using some prior input signals corresponding to digitizations of detected radar signals reflected off of the second component 520 in a variety of different positions and orientations relative to the first component 510. Once pre-trained, the random forest classifier may be further trained using data obtained at runtime, so as to enable the first component 510 to "tweak" or otherwise fine-tune its radar signature recognition capabilities as applied to a particular target object, user, and/or environment. As another example, generalized learning classifier systems (e.g., random forest classifiers) could be trained using input signals associated with groups of users and/or target objects, rather than for individual users and/or target objects. Such learning classifier systems may be recursively trained using data from one or more computing devices equivalent or similar to the first component 510, such as input signals corresponding to digitizations of detected radar signals reflected off of one or more target objects, such as one or more computing devices equivalent or similar to the second component 520. In some examples, these techniques are implemented at least partially in systems external to the first component 510. For instance, a remote server may train a learning classifier system on large sets of data, and communicate parameters or output of that learning classifier system to the first component 510 via a computer network.

In some implementations, processing at stage 810 can include analyzing input radar signals received by the first component 510 to recognize radar signatures of one or more portions of the physical housing structure of the second component 520, componentry of the second component 520 (e.g., circuits, user interface elements, etc.), or combinations thereof. In some examples, one or more portions of the physical housing structure of the second component 520 may be constructed out of materials with unique radar reflection characteristics (e.g., radar reflective materials, radar absorbent materials, or a combination thereof). In these examples, processing at stage 810 can include analyzing input radar signals received by the first component 510 to recognize radar signatures of one or more materials out of which one or more inner or outer portions of the second component 520 are constructed. Similarly, in some implementations, the second component 520 may include one or more radar reflectors (e.g., retroreflectors, nonlinear radar reflectors, etc.) with unique radar reflection characteristics. In these implementations, processing at stage 810 can include analyzing input radar signals received by the first component 510 to recognize radar signatures of one or more radar reflectors of the second component 520. As described above with reference to FIG. 5B, in some examples, such radar signatures may correspond to harmonics or intermodulation frequencies of one or more frequency components of radar signals emitted by the first component 510 (e.g., the first radio signal). In some implementations, one or more of the abovementioned materials or radar reflectors may be disposed in or on one or more portions of the second component 520 that are configured to remain unobscured by a hand or fingers of a user when held and utilized by such a user in a normal manner.

In some examples, the first component 510 may further leverage one or more machine learning techniques for recognizing radar signatures of one or more portions of the human body, as the locations of one or more portions of the human body may be informative as to where the target object (e.g., the second component 520) is or is not located. For example, for scenarios in which the second component 520 is held in a particular hand of a user, determining the location of one or more portions of the particular hand or fingers thereof may enable the first component 510 to determine the location of the second component 520 with a greater degree of confidence. In some examples, by recognizing a radar signature of one or more portions of the human body in one or more input radar signals received by the first component 510, the first component 510 can shift its attention to analyzing other portions of such one or more input radar signals for the presence of the second component 520. In these examples, upon recognizing a radar signature of one or more portions of the human body in one or more input radar signals received by the first component 510, the first component 510 may effectively ignore the identified portions of the one or more input radar signals so as to prune the search space for radar signatures of the second component 520. From the output of stage 810, a peak detection stage 820 can identify peaks (e.g., signal components exceeding a threshold magnitude) of the processed input signal. This peak information can be used to, at stage 830, determine a range (distance) 832 from the first component 510 to the second component 520; and at stage 840, determine an angle of arrival 842 of the input signal 802 with respect to the first component 510. Techniques for recovering the range 832 and angle 842 of a target using a reflected radar signal, such as at stages 830 and 840, respectively, will be familiar to those skilled in the art. Similarly, because the range 832 and angle 842 describe the distance, along a particular vector, of the second component 520 from the first component 510, the position of the second component 520 from the first component 510 can be readily determined.

In some examples, a rate of change of the range (852) and a rate of change of the angle of arrival (862) can be determined, at stages 850 and 860, respectively. For example, these rates of change can be determined, using techniques familiar to those skilled in the art, based on changes in the frequency of the detected radar signal with respect to the frequency of the transmitted signal. These changes in frequency are functions of the velocity vector of the second component 520 at the time of reflection, resulting from the Doppler effect, and this velocity vector can be recovered according to these functions. Knowing the velocity of the second component 520 can permit more accurate models of the location of the second component 520, for example by enabling the prediction of the location of the second component 520 at time intervals between radar signal detection. Similarly, such predictive models can improve system efficiency by reducing the frequency with which radar signals must be transmitted and received in order to obtain a sufficiently accurate position determination.

Figure 9:
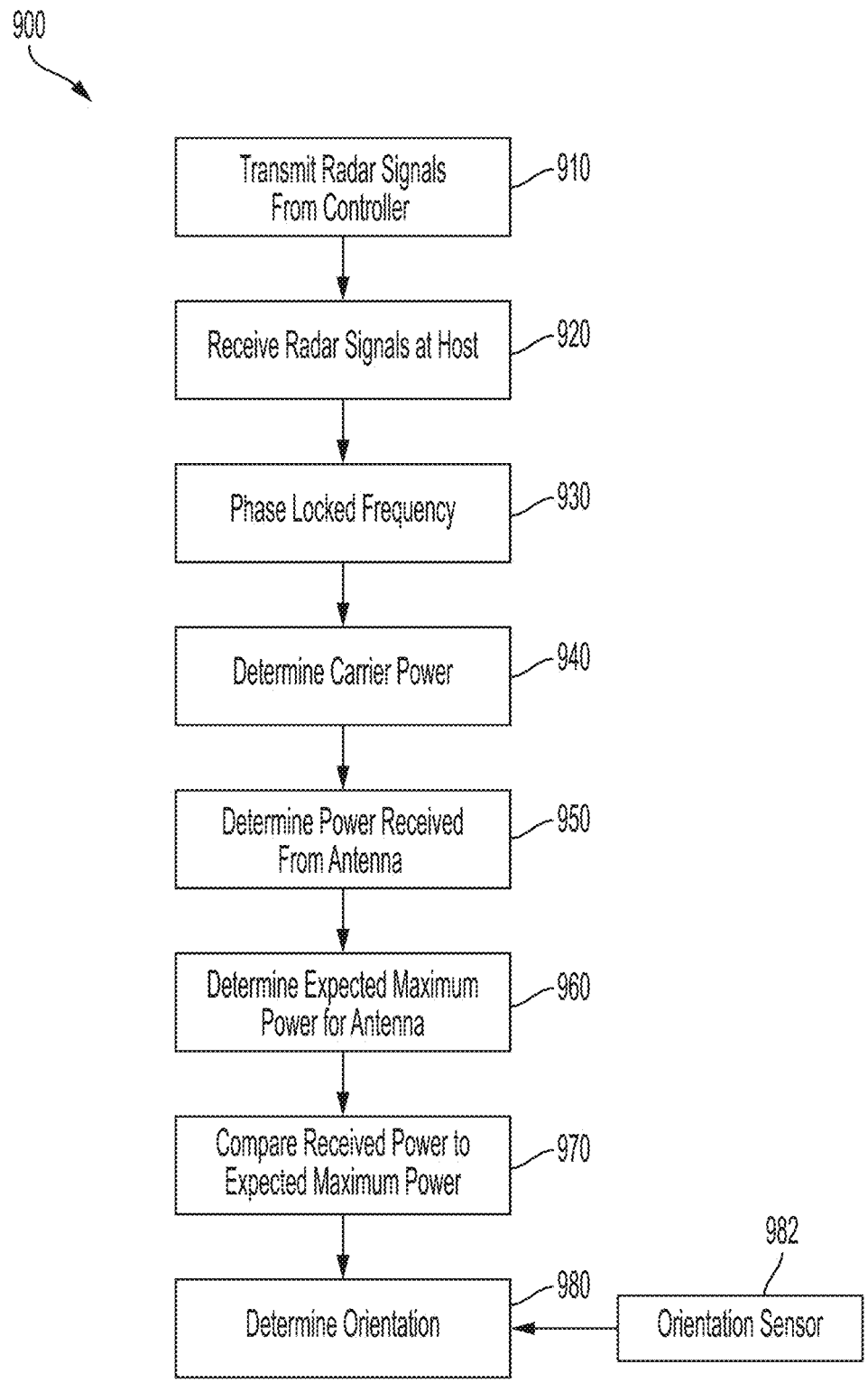
FIG. 9 illustrates an example process for determining an orientation of a second system component relative to a first system component, according to examples of the disclosure.

While the first tracking mode can yield the position of the second component 520 relative to the first component 510, such as described above, it does not necessarily yield the orientation of the second component 520. This is the function of the second tracking mode. In the second tracking mode, determining an orientation of the second component 520 can proceed according to the example process 900 shown in FIG. 9. As with example process 800, some or all steps of process 900 may correspond to signal processing stage 732 described above with respect to FIG. 7; and may be implemented on the first component 510 using one or more CPUs, DSPs, or other suitable circuitry.

At stage 910 of example process 900, one or more radar signals may be transmitted from an antenna array of the second component 520 (e.g., via second radar transmitter 522). These radar signals may correspond to the example radiation patterns described above with respect to FIGS. 6A-6D. As described above, each antenna in the antenna array (e.g., each of six orthogonally oriented antennas) can emit a directional radio signal, aligned to an axis corresponding to the orientation of the antenna. Further, each such radio signal can be modulated by a carrier frequency unique to each antenna.

At stage 920, these signals may be received by a host device (e.g., the first radar receiver 514 of the first component 510), for example according to the process described by reception process 720. At stage 930, the received signals can be processed by phase-locking to the respective carrier frequencies of the signals, thereby identifying the antenna corresponding to each signal. At stage 940, a carrier power level can be determined, such as by a baseband unit of first component 510. At stage 950, a power level of a received signal corresponding to an antenna can be determined. (In some examples, the strongest received signal may be selected.) At stage 960, the expected maximum power of the received signal can be determined; for example, based on the carrier power level determined at stage 940, on the range 832 determined as described above with respect to FIG. 8, and on the radiation pattern corresponding to the antenna. The expected maximum power can provide a baseline measurement for determining the power loss of the signal received. This expected maximum power can represent, for example, the signal power that would be received if the receiving antenna were perfectly aligned with the axis of the corresponding transmitting antenna.

At stage 970, the received power can be compared against the expected maximum power determined at stage 960. The ratio of the received power to the expected maximum power can be used to determine, at stage 980, the orientation of the receiving antenna with respect to the transmitting antenna. For example, it may be determined at stage 980 that the power of a received signal is equal to 0.5 times the expected maximum power of that signal. A radiation model of the transmitting antenna corresponding to the signal (e.g., one of the radiation models shown in FIGS. 6A-6D) can identify a relationship between the signal gain and an orientation of the receiving antenna with respect to the transmitting antenna; accordingly, the power ratio (e.g., 0.5) can be used as input into the radiation pattern to yield the orientation of the transmitting antenna. Because the transmitting antenna can be fixed relative to the second component 520, the orientation of the transmitting antenna can yield the orientation of the second component 520. In some examples, stages 950, 960, 970, and 980 can be repeated for various signals received from different antennas, with the results used to improve the accuracy of the determined orientation.

In some cases, determining the orientation of the second component 520 from the received power, such as described above, may not yield an unambiguous result. For instance, antennas (e.g., those described by the radiation patterns shown in FIGS. 6A-6C) typically emit radiation symmetrically around an axis; supplying a power ratio as input to an radiation pattern may thus yield not a single antenna orientation, but a set of possible orientations. This ambiguity can be resolved by incorporating data 982 one or more additional orientation sensors, such as one or more IMUs (e.g., IMUs 516 and/or 526), as needed to supplement and refine the orientation determination at stage 980.

Figure 10:
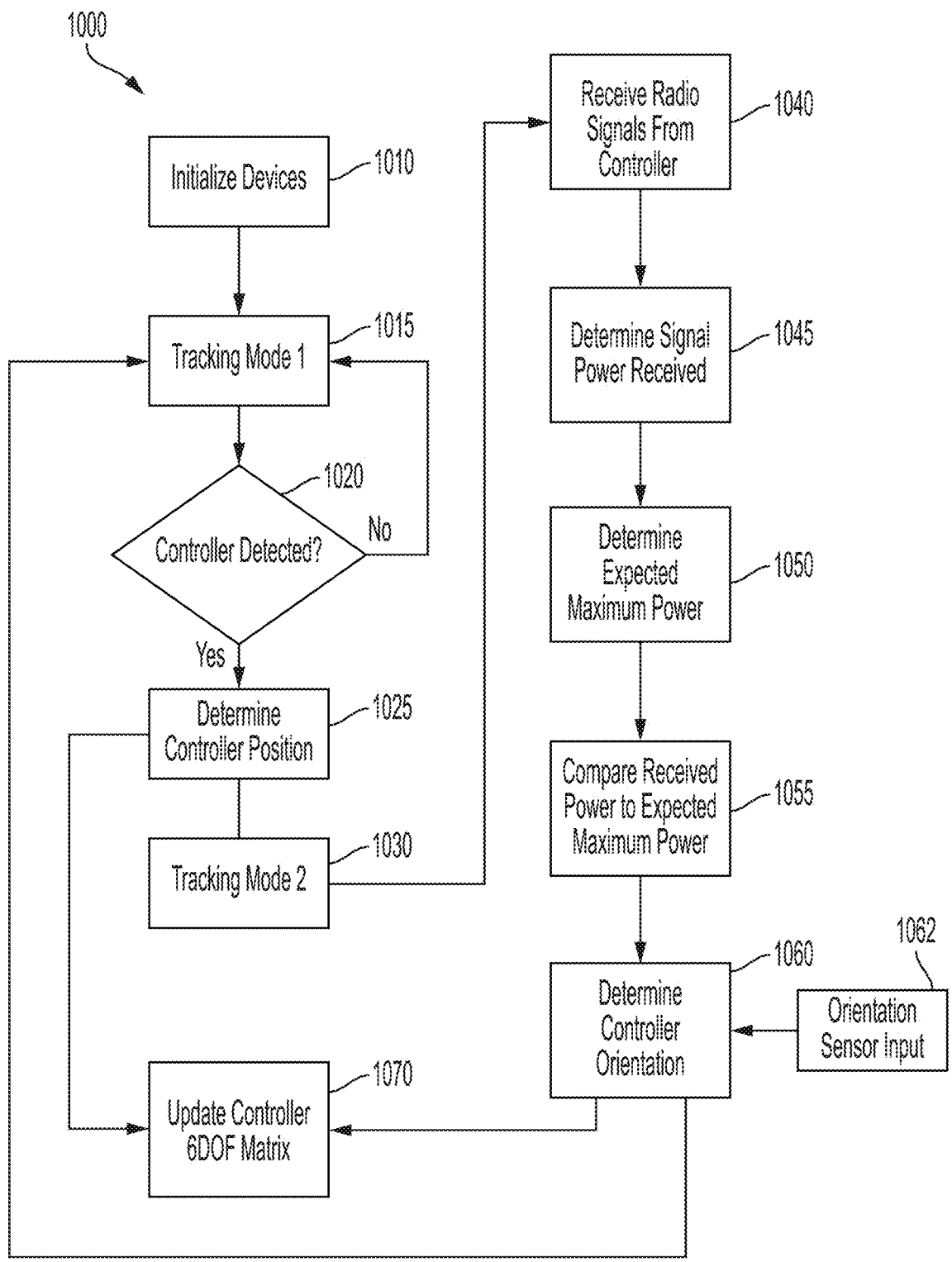
FIG. 10 illustrates an example process for determining a position and orientation of a second system component relative to a first system component, according to examples of the disclosure.

FIG. 10 illustrates an example process 1000 for determining the 6DOF location of a handheld controller (which may correspond to handheld controller 300 and/or second component 520 above) of a wearable system using a wearable head unit (which may correspond to wearable head unit 200 and/or first component 510 above) of the wearable system. The 6DOF location may be represented as a matrix comprising X, Y, and Z coordinates representing a position, and pitch, yaw, and roll values representing orientation. As described above, the use of the handheld controller and wearable head unit in this example process is exemplary, and the example process could be used to track any suitable component of a wearable system using another component of the wearable system.

At stage 1010, which may be entered upon a request to determine a 6DOF location of the handheld controller, both devices (the wearable head unit and the handheld controller) can perform any necessary initialization or calibration procedures. At this stage, the handheld controller may enter a mode in which it continually transmits radio signals (e.g., as described above) throughout the process. At stage 1015, the wearable head unit enters the first tracking mode as described above. In this mode, which is intended to determine the position of the controller, the wearable head unit transmits a radio signal (e.g., as described above with respect to transmission process 710) and also receives echoes of that radio signal (e.g., as described above with respect to reception process 720). At stage 1020, the wearable head unit may continue to loop within tracking mode 1 until the controller is detected (e.g., until a reflection of the radio signal transmitted by the wearable head unit is received by the wearable head unit). Upon detecting the controller, the controller's position (e.g., range and angle) can be determined at stage 1025, for example as described above with respect to FIG. 8 and example process 800. This position can be provided as input to stage 1070 to update the X, Y, and Z coordinates of the 6DOF matrix. In some examples (not shown in FIG. 10), while in the first tracking mode, the position of the controller can be predicted (e.g., based on a detected velocity of the controller) in between transmitting radar signals, such as described above; the 6DOF matrix can be updated at stage 1070 with these predicted values.

Upon determining the controller position, the wearable head unit can enter tracking mode 2 at stage 1030. In the second tracking mode, as described above, the wearable head unit pauses transmitting radio signals, and instead detects radio signals transmitted by the controller. At stage 1040, these radio signals can be received from the controller at the wearable head unit, for example as described above with respect to reception process 720. At stage 1045, upon receiving the signals, the wearable head unit can determine signal power levels of the received signals (e.g., as in stage 950 of example process 900). At stage 1050, the expected maximum power of a signal can be determined (e.g., as in stage 960 of example process 900). At stage 1055, the power of a received signal can be compared to the expected maximum power (e.g., as in stage 970 of example process 900). And at stage 1060, as described above with respect to stage 980 of example process 900, the controller orientation can be determined from the ratio of the received signal power to the expected maximum power, using the radiation characteristics of the corresponding transmitting antenna; with orientation sensor input 1062 used to supplement and refine the determined controller orientation.

Upon determining the controller orientation at stage 1060, the wearable head unit can return to stage 1015, where it enters the first tracking mode, and continues the process described above. Meanwhile, the controller orientation can be used at stage 1070 to update the 6DOF matrix with the current controller orientation (e.g., values for the pitch, yaw, and roll of the controller). As such, the 6DOF matrix maintains a continually updated data structure representing the most recently available position and orientation of the controller with respect to the wearable head unit.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A method of locating a second device, the method comprising, at a first device:
   while in a first mode, transmitting a first signal and receiving a second signal, the second signal comprising a reflection of the first signal by the second device;
   determining, based on the received second signal, a position of the second device relative to the first device;
   transitioning from the first mode to a second mode, wherein transitioning from the first mode to the second mode comprises discontinuing transmitting the first signal;
   while in the second mode, forgoing transmitting the first signal, and further while in the second mode, receiving a third signal from the second device, wherein the third signal is not provided by the second device in response to a signal from the first device; and
   determining, based on the third signal, an orientation of the second device relative to the first device,
   wherein:
      the first device comprises one or more receiving antennas,
      the second device comprises one or more transmitting antennas,
      the third signal corresponds to an antenna of the one or more transmitting antennas,
      determining the position of the second device relative to the first device comprises determining a translation matrix relating a position of the second device to a position of the first device, and
      determining the orientation of the second device relative to the first device comprises determining a ratio of a signal power of the third signal to an expected maximum signal power of the antenna to which the third signal corresponds.

2. The method of claim 1, wherein the first signal, the second signal, and the third signal are radar signals.

3. The method of claim 1, wherein the first device and the second device are components of a wearable system.

4. The method of claim 3, wherein the first device comprises a wearable head unit and the second device comprises a handheld controller.

5. The method of claim 1, wherein the second device comprises an orientation sensor, and the orientation of the second device relative to the first device is determined based on an output of the orientation sensor.

6. The method of claim 1, wherein determining the orientation of the second device relative to the first device comprises determining a polarization of the third signal.

7. The method of claim 6, wherein determining the orientation of the second device relative to the first device further comprises determining, based on a radiation model associated with the antenna, an orientation of the antenna corresponding to the ratio.

8. The method of claim 1, wherein determining the translation matrix comprises determining the position of the first device relative to an inertial coordinate space.

9. The method of claim 8, wherein the position of the first device relative to the inertial coordinate space is determined via Simultaneous Localization and Mapping (SLAM) and/or visual odometry.

10. The method of claim 8, wherein the first device comprises one or more cameras, and wherein the method further comprises determining, based on information from the one or more cameras, the inertial coordinate space.

11. The method of claim 8, wherein the inertial coordinate space is associated with an environment of the first device.

12. The method of claim 1, wherein:
   the first device comprises a plurality of receiving antennas, each receiving antenna of the plurality orthogonal to the other receiving antennas of the plurality; and
   the second device comprises a plurality of transmitting antennas, each transmitting antenna of the plurality orthogonal to the other transmitting antennas of the plurality.

13. The method of claim 1, wherein the method further comprises receiving a fourth signal from the second device while in the second mode, wherein the fourth signal corresponds to data from an inertial measurement unit of the second device.

14. The method of claim 1, wherein determining the position of the second device relative to the first device further comprises identifying a first radar signature of the second device, wherein the first radar signature is based on a configuration of at least one reflector disposed on the second device.

15. The method of claim 1, wherein determining the position of the second device relative to the first device further comprises identifying a second radar signature of one or more portions of a human body.

16. A first device comprising:
   one or more receiving antennas, each receiving antenna configured to receive radar signals;
   one or more processors configured to perform a method comprising, at the first device:
      while in a first mode, transmitting a first signal and receiving a second signal, the second signal comprising a reflection of the first signal by a second device;
      determining, based on the received second signal, a position of the second device relative to the first device;
      transitioning from the first mode to a second mode, wherein transitioning from the first mode to the second mode comprises discontinuing transmitting the first signal;
      while in the second mode, forgoing transmitting the first signal, and further while in the second mode, receiving a third signal from the second device, wherein the third signal is not provided by the second device in response to a signal from the first device; and
      determining, based on the third signal, an orientation of the second device relative to the first device,
      wherein:
         the second device comprises one or more transmitting antennas,
         the third signal corresponds to an antenna of the one or more transmitting antennas,
         determining the position of the second device relative to the first device comprises determining a translation matrix relating a position of the second device to a position of the first device, and
         determining the orientation of the second device relative to the first device comprises determining a ratio of a signal power of the third signal to an expected maximum signal power of the antenna to which the third signal corresponds.

17. The device of claim 16, wherein the method further comprises receiving a fourth signal from the second device while in the second mode, wherein the fourth signal corresponds to data from an inertial measurement unit of the second device.

18. The device of claim 16, wherein determining the position of the second device relative to the first device further comprises identifying a first radar signature of the second device, wherein the first radar signature is based on a configuration of at least one reflector disposed on the second device.

19. A wearable system comprising:
   a first device comprising one or more receiving antennas, each receiving antenna configured to receive radar signals, and one or more processors;
   a second device comprising one or more transmitting antennas, each receiving antenna configured to transmit radar signals;
   wherein the one or more processors of the first device are configured to perform a method comprising, at the first device:
      while in a first mode, transmitting a first signal and receiving a second signal, the second signal comprising a reflection of the first signal by a second device;
      determining, based on the received second signal, a position of the second device relative to the first device;
      transitioning from the first mode to a second mode, wherein transitioning from the first mode to the second mode comprises discontinuing transmitting the first signal;
      while in the second mode, forgoing transmitting the first signal, and further while in the second mode, receiving a third signal from the second device, wherein the third signal is not provided by the second device in response to a signal from the first device; and
      determining, based on the third signal, an orientation of the second device relative to the first device,
      wherein:
         the third signal corresponds to an antenna of the one or more transmitting antennas,
         determining the position of the second device relative to the first device comprises determining a translation matrix relating a position of the second device to a position of the first device, and
         determining the orientation of the second device relative to the first device comprises determining a ratio of a signal power of the third signal to an expected maximum signal power of the antenna to which the third signal corresponds.

20. The system of claim 19, determining the orientation of the second device relative to the first device further comprises receiving a fourth signal from the second device while in the second mode, wherein the fourth signal corresponds to data from an inertial measurement unit of the second device.

21. The system of claim 19, wherein the second device is associated with a first radar signature, wherein the first radar signature is based on a configuration of reflectors disposed on a physical housing of the second device.

22. The system of claim 19, wherein determining the position of the second device relative to the first device further comprises identifying a first radar signature of the second device.

23. The system of claim 19, wherein determining the position of the second device relative to the first device further comprises identifying a second radar signature of one or more portions of a human body.

* * * * *